(12) United States Patent
Zhao

(10) Patent No.: US 11,032,377 B2
(45) Date of Patent: Jun. 8, 2021

(54) METHOD, COMMUNICATION TERMINAL, AND COMMUNICATION NODE DEVICE FOR ASSOCIATING RESOURCES

(71) Applicant: BOE Technology Group Co., Ltd., Beijing (CN)

(72) Inventor: Junjie Zhao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 296 days.

(21) Appl. No.: 16/184,457

(22) Filed: Nov. 8, 2018

(65) Prior Publication Data

US 2019/0149613 A1    May 16, 2019

(30) Foreign Application Priority Data

Nov. 13, 2017 (CN) .......................... 201711116791.4

(51) Int. Cl.
*H04L 29/08* (2006.01)
(52) U.S. Cl.
CPC ............ *H04L 67/141* (2013.01); *H04L 67/04* (2013.01); *H04L 67/12* (2013.01)
(58) Field of Classification Search
CPC ........ H04L 67/141; H04L 67/04; H04L 67/12
See application file for complete search history.

(56) References Cited

U.S. PATENT DOCUMENTS

| 9,338,628 | B2 | 5/2016 | Webb | |
|---|---|---|---|---|
| 2015/0227618 | A1* | 8/2015 | Dong | ...................... H04L 67/16 |
| | | | | 707/736 |
| 2016/0219125 | A1* | 7/2016 | Xiao | ....................... H04L 67/28 |
| 2017/0006455 | A1* | 1/2017 | Cho | .................... G06F 16/9535 |
| 2017/0295452 | A1 | 10/2017 | Wu | |
| 2017/0332426 | A1* | 11/2017 | Wu | ........................ H04W 60/00 |

FOREIGN PATENT DOCUMENTS

| CN | 105491620 A | 4/2016 |
|---|---|---|
| CN | 105828273 A | 8/2016 |
| WO | 2014114354 A1 | 7/2014 |

OTHER PUBLICATIONS

First Office Action, including Search Report, for Chinese Patent Application No. 201711116791.4, dated Jan. 26, 2021, 18 pages.

* cited by examiner

*Primary Examiner* — Benjamin M Thieu
(74) *Attorney, Agent, or Firm* — Westman, Champlin & Koehler, P.A.

(57) ABSTRACT

There is disclosed a method for associating at least two resources, a communication terminal and a communication node device. The method comprises detecting a connection state for entities respectively corresponding to the at least two resources; and sending a first request to a common service entity to establish an association between the at least two resources after it is detected that the connection state is established by the entities.

17 Claims, 18 Drawing Sheets

METHOD, COMMUNICATION TERMINAL, AND COMMUNICATION NODE DEVICE FOR ASSOCIATING RESOURCES

CROSS-REFERENCE TO RELATED APPLICATION(S)

This application claims priority to the Chinese Patent Application No. 201711116791.4, filed on Nov. 13, 2017, entitled "METHOD, COMMUNICATION TERMINAL, AND COMMUNICATION NODE DEVICE FOR ASSOCIATING RESOURCES", which is incorporated herein by reference in its entirety.

TECHNICAL FIELD

The present disclosure relates to the communication field, and more particularly, to a method, a communication terminal, and a communication node device for associating resources.

BACKGROUND

With the rapid development of Internet of Things (IoT) technology in various fields of application, constructing a big data system has drawn great attention. In fact, first associating various data resources is required in constructing the big data system. At present, the data of separate IoT devices are transmitted to a common service platform and stored as separate data, which are not related to each other. This is not conducive to a comprehensive analysis of data and affects the construction of the big data system.

SUMMARY

According to a first aspect of the present disclosure, there is provided a method for associating at least two resources, comprising detecting a connection state for entities respectively corresponding to the at least two resources; and sending a first request to a common service entity to establish an association between the at least two resources after it is detected that the connection state is established by the entities.

In an embodiment of the present disclosure, the method further comprises sending a second request to the common service entity to cancel the association between the at least two resources when it is detected that the connection of the entities is disconnected.

In an embodiment of the present disclosure, the detecting of the connection state for entities respectively corresponding to the at least two resources comprises detecting whether the entities respectively corresponding to the at least two resources are located in a same local area network.

In an embodiment of the present disclosure, the local area network is a personal area network.

According to a second aspect of the present disclosure, there is provided a method for associating at least two resources, comprising receiving a first request for establishing an association between the at least two resources; and setting attributes of the resources on a common service entity according to the first request to establish the association between the at least two resources.

In an embodiment of the present disclosure, the method further comprises receiving a second request for canceling the association between the at least two resources; and setting attributes of the resources on the common service entity according to the second request to cancel the association between the at least two resources.

In an embodiment of the present disclosure, the first request is a request for creating or updating a resource, such that the attributes of the resource are set on the common service entity to establish the association between the at least two resources.

In an embodiment of the present disclosure, the second request is a request for updating the resource, such that the attributes of the resource are set on the common service entity to cancel the association between the at least two resources.

In an embodiment of the present disclosure, the created or updated resource is a group resource or a non-group resource.

In an embodiment of the present disclosure, the attributes of the resource comprise an associated member list and an association start time, wherein the association start time is used to set a time for establishing the association, and the associated member list is used to set the associated resources.

In an embodiment of the present disclosure, the attributes of the resource further comprise an association end time for setting a time for canceling the association.

In an embodiment of the present disclosure, the attributes of the resource comprises an associated member record and an association start time record, wherein the association start time record is used to set a time for each association establishment, and the associated member record is used to set a resource to which each association points.

In an embodiment of the present disclosure, the association start time record is further used to indicate a time for the last association cancellation, and a blank entry in the associated member record is used to cancel the association.

In an embodiment of the present disclosure, the attributes of the resource further comprise an association enabling identifier for setting whether the association between the at least two resources is valid or not.

In an embodiment of the present disclosure, the first request and the second request come from the same or different entities.

According to a third aspect of the present disclosure, there is provided a communication terminal comprising a processor and a memory, wherein the memory is configured to store program instructions, which, when executed by the processor, causes the processor to implement the above method.

According to a fourth aspect of the present disclosure, there is provided a communication node device comprising a processor, wherein the processor is configured to perform the above method.

BRIEF DESCRIPTION OF THE DRAWINGS

In order to more clearly illustrate the technical solutions of the embodiments of the present disclosure, the accompanying drawings of the embodiments will be briefly described below. It is to be understood that the accompanying drawings described below are merely some embodiments of the present disclosure and are not intended to be limiting of the present disclosure. For those skilled in the art, other drawings can also be obtained according to these drawings without any creative efforts.

DETAILED DESCRIPTION

In order to enable the purposes, technical solutions and advantages of the embodiments of the present disclosure to be clearer, the present disclosure will be described in further details below in conjunction with the accompanying drawings. Obviously, the described embodiments are merely a part of the embodiments of the present disclosure, instead of all the embodiments. All other embodiments obtained by one of ordinary skill in the art based on the described embodiments without contributing any creative labor are also within the scope of the present disclosure.

Figure 1:
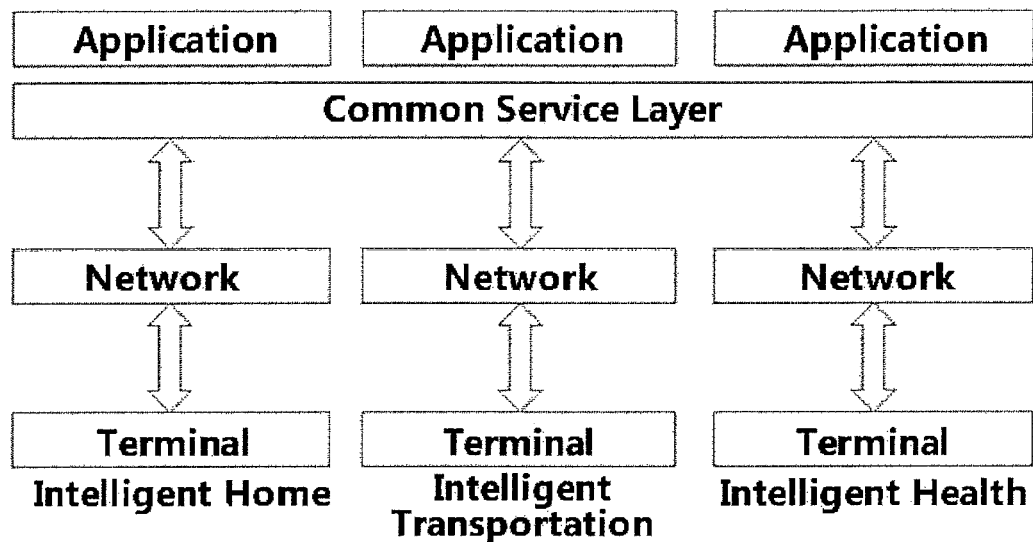
FIG. 1 schematically illustrates an exemplary application architecture for Internet of Things (IoT).
Figure 2:
FIG. 2 schematically illustrates a small network system to which the principles of the present disclosure may be applied, such as a wireless personal area network (WPAN).

With the development of information technology, especially the Internet technology, the Internet of Things (IoT) technology for realizing informatization, remote management control and intelligent network is maturing. IoT uses communication technologies such as local networks or the Internet to connect sensors, controllers, machines, personnel and things together through a new way to form association among people and things and among things and things. IoT is an extension of the Internet, which includes the Internet and all resources on the Internet, and is compatible with all Internet applications. With the application of IoT technology in various fields, various new application fields such as intelligent home, intelligent transportation and intelligent health have emerged. As shown in FIG. 1, various terminal devices access the network and have access to a common service layer through the network, and the common service layer supports various applications, thereby forming an architecture of the terminal+network+application. For example, in the field of intelligent home, various home devices can utilize a local area network (LAN) to access a common service platform, e.g., such as wireless or wired; optionally, the LAN may be a personal area network (PAN). Taking a wireless personal area network (WPAN) as an example, the access may be achieved by various technologies such as Bluetooth, IrDA, Home RF, ZigBee, or UWB (Ultra-Wideband Radio). For example, in a user's home, smartphones, printers, scanners, smart speakers, game controllers, laptops, earphones and the like can be connected to the PAN. FIG. 2 illustrates such a situation.

As mentioned above, when an IoT entity, for example, which may be a software module in an IoT terminal device or a node device, transmits data or information to the common service platform and stores the same as separate resources, individual resources do not have relevance to each other, which is not conducive to a comprehensive analysis of the data and affects the construction of big data systems.

To this end, embodiments of the present disclosure propose that by associating various resources transmitted to a common service platform, the associated resources can be comprehensively analyzed when needed, so as to increase the value of data and reduce the dimension of data analysis.

According to a first aspect of the present disclosure, it is proposed that the associations between various resources can be set and managed by creating or updating group resources according to the needs of the entities, so as to comprehensively analyze the attributes of the associated respective resources; in addition, the associations between resources can be canceled or updated based on the entity's request, so as to set the associations between resources flexibly.

It should be noted that the resources herein are those that include various entities, e.g., may be embodied as software modules in IoT devices, such as AE (i.e., Application Entity), CSE (i.e., Common Services Entity) and other entities.

Figure 3A:
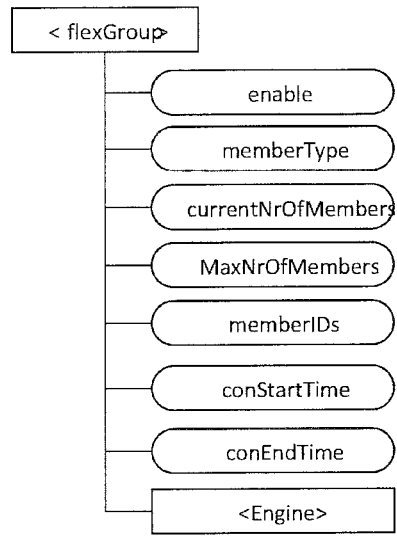
FIGS. 3A-3B schematically illustrate a structure of a new type of group resource created in accordance with an embodiment of the disclosure.

According to an embodiment of the present disclosure, it is proposed that the associations between the respective resources can be established and managed by creating a new type of group resource. As shown in FIG. 3A, the created new type of group resource <flexGroup> includes the group resource attributes: the association start time conStartTime and the association end time conEndTime; wherein conStartTime indicates the time when the association is established and conEndTime indicates the time when the association is canceled.

Optionally, as shown in FIG. 3A, the new type of group resource may further include a sub-resource <Engine>. In the sub-resource <Engine>, a rule or method for operating or calculating the contents of the associated resources may be set, so that the contents of the resources of the associated entities may be operated or analyzed based on the set rule and method for the operation or calculation, in order to improve the comprehensiveness and quality of the data analysis.

Optionally, as shown in FIG. 3A, the new type of group resource may further include resource attributes such as memberType, currentNrOfMembers, MaxNrOfMembers and memberIDs. Wherein the resource attribute memberType indicates the type of the member included in the group, for example, all the members are set to belong to the same type; otherwise, the memberType may be set to "mixed" indicating that the members do not belong to the same type; currentNrOfMembers indicates the current number of members included in the group; MaxNrOfMembers indicates the maximum number of members that can be included in the group; memberIDs indicates the ID identifiers of all members in the group, for example, A; B; C; D; E; . . . , each member A, B, C, D, E, . . . being separated by a semicolon; in this way, each associated member in the group is reflected. Certainly, the manner representing the associated members in the group as described above is merely exemplary and is not intended to be limiting of the principles of the present disclosure.

Optionally, as shown in FIG. 3A, the new type of group resource may further include the resource attribute enable to indicate the validity of the association. When enable is set to true, it indicates that there is a valid association between the members to which the resource attribute memberIDs points, and when enable is set to false, it indicates that there is no valid association between the members to which the resource attribute memberIDs points.

With this type of group resource, the association cancelation may be denoted by setting conEndTime, or the association cancelation may also be denoted by setting enable. Thus, the created group resource may optionally include the resource attribute enable.

Figure 3B:
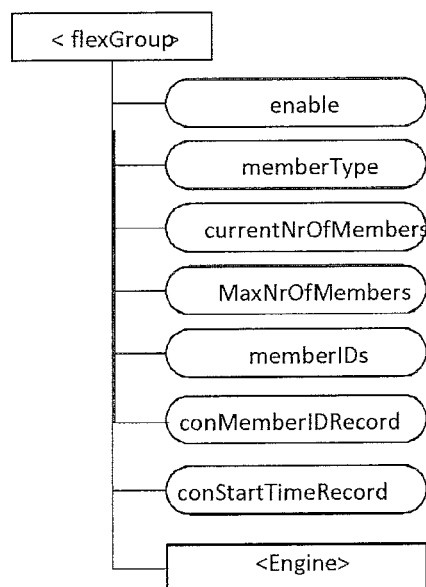

As a variant, as shown in FIG. 3B, in addition to the resource attribute memberIDs, the created new type of group resource <flexGroup> may include a resource attribute conMemberIDrecord. memberIDs indicates the ID identifiers of all the members in the group, and conMemberIDrecord indicates the associated member record, for example, A+B; 0; B+C; A+C and so on, each association being separated by a semicolon; A+B indicates that members A and B are associated; 0 indicates that there is no member association, that is, the associated member list is empty, indicating that the association is canceled; B+C indicates that members B and C are associated; and A+C indicates that members A and C are associated. Certainly, the manner representing the associated members in the group as described above is merely exemplary and is not intended to be limiting of the principles of the present disclosure. In this way, some of the members included in the group resource may be selected to be associated, so that the associations between the members in the group may be flexibly set, and the needs to uniformly set the associations between all the members in the group may be avoided.

Further, as shown in FIG. 3B, unlike FIG. 3A, the created new type of group resource may not include the resource attribute conEndTime, but may include the association start time record conStartTimeRecord, wherein conStartTimeRecord records the time of each association establishment, for example, T1; T2; T3; T4; . . . .

As a result, the associated members and associated time may be updated by combining the resource attribute conMemberIDrecord with the resource attribute conStartTimeRecord, so that multiple associated relationships may be recorded. As an example, the association start time record conStartTimeRecord may correspond to the associated member record. In the example above, T1 corresponds to A+B, indicating the time at which the association between members A and B is established. T2 corresponds to 0, indicating the time at which the association between members A and B is canceled. T3 corresponds to B+C, indicating the time at which the association between members B and C is established. T4 corresponds to A+C, not only indicating the time at which the association between members A and C is established, but also indicating the time at which the last association is canceled, that is, the time when the association between members B and C is canceled. In this way, it is not necessary to separately set the association end time, but to infer and record the association end time from the association start time list and the associated member list.

Optionally, as shown in FIG. 3B, the new type of group resource may further include resource attributes such as memberType, currentNrOfMembers, MaxNrOfMembers and memberIDs. Wherein the resource attribute memberType indicates the type of the member included in the group, for example, all the members are set to belong to the same type; otherwise, the memberType may be set to "mixed" indicating that the members do not belong to the same type; the resource attribute currentNrOfMembers indicates the current number of members included in the group; MaxNrOfMembers indicates the maximum number of members that can be included in the group; the resource attribute memberIDs indicates the ID identifiers of all members in the group, for example, A; B; C; D; E; . . . , each member A, B, C, D, E, . . . being separated by a semicolon; in this way, each associated member in the group is reflected. Certainly, the manner representing the associated members in the group as described above is merely exemplary and is not intended to be limiting of the principles of the present disclosure.

Optionally, as shown in FIG. 3B, the new type of group resource may further include the resource attribute enable to indicate the validity of the association. When enable is set to true, it indicates that there is a valid association between the members to which the current entry of the resource attribute conMemberIDrecord points, and when enable is set to false, it indicates that there is no valid association between the members to which the current entry of the resource attribute con MemberIDrecord points.

With this type of group resource, the association cancelation may be denoted by adding 0 in the associated member record conMemberIDrecord as the current entry, or the association cancelation may also be denoted by setting enable. Thus, the created group resource may not include the resource attribute enable.

The created new type of group resource is described above in conjunction with FIGS. 3A-3B. In fact, the need to implement the principles of the present disclosure may also be met by adding corresponding sub-resources and/or attributes on the basis of existing types of group resources.

Below, the description that the need to implement the principles of the present disclosure may be met by adding corresponding sub-resources and/or attributes on the basis of existing types of group resources, in accordance with an embodiment of the present disclosure will be explained in conjunction with FIGS. 4A-4B.

Figure 4A:
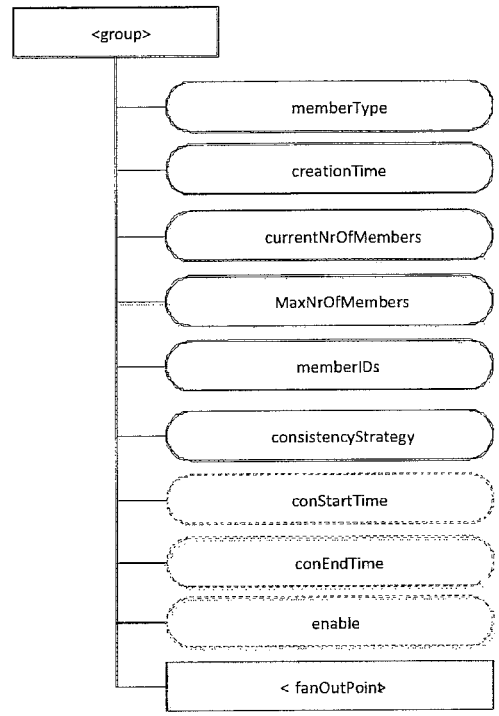
FIGS. 4A-4B schematically illustrate a structure of a modified existing group resource in accordance with an embodiment of the disclosure.

As shown in FIG. 4A, resource attributes: the association start time conStartTime and the association end time conEndTime may be added to an existing type of group resource <group>, wherein conStartTime indicates the time when the association is established and conEndTime indicates the time when the association is canceled.

As shown in FIG. 4A, the existing type of group resource <group> may include resource attributes and sub-resources such as memberType, currentNrOfMembers, MaxNrOfMembers, memberIDs, creationTime, consistencyStrategy, and <fanOutPoint>. The resource attribute memberType indicates the type of the member included in the group, for example, all the members are set to belong to the same type; otherwise, the memberType may be set to "mixed" indicating that the members do not belong to the same type; the resource attribute currentNrOfMembers indicates the current number of members included in the group; MaxNrOfMembers indicates the maximum number of members that can be included in the group; the resource attribute memberIDs indicates the ID identifiers of all members in the group, for example, A; B; C; D; E; . . . , each member A, B, C, D, E, . . . being separated by a semicolon; in this way, each associated member in the group is reflected. Certainly, the manner representing the associated members in the group as described above is merely exemplary and is not intended to be limiting of the principles of the present disclosure. The resource attribute creationTime indicates the time when the group is created, and its value is assigned by the system when the group is created and cannot be changed; consistencyStrategy indicates how to process the group if the memberType is inconsistent; for example, if this attribute is set to ABANDON_MEMBER, the inconsistent member is deleted; if this attribute is set to ABANDON_GROUP, the group is deleted; and if this attribute is set to SET_MIXED, the memberType is set to "mixed"; the sub-resource <fanOutPoint> belongs to the virtual resource, and if a request is sent to the sub-resource <fanOutPoint>, the request is forwarded to each member in the group indicated by memberIDs, and then the response from each member is aggregated and returned to the originator.

Optionally, as shown in FIG. 4A, the modified type of group resource may further add the resource attribute enable to indicate the validity of the association. When enable is set to true, it indicates that there is a valid association between the members to which the resource attribute memberIDs points, and when enable is set to false, it indicates that there is no valid association between the members to which the resource attribute memberIDs points.

With this type of group resource, the association cancelation may be denoted by setting conEndTime, or the association cancelation may also be denoted by setting enable. Thus, the created group resource may optionally include the resource attribute enable.

Figure 4B:
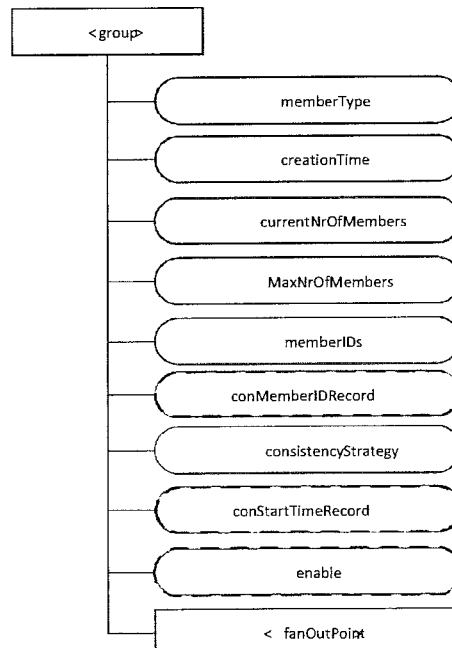

As a variant, as shown in FIG. 4B, a resource attribute conMemberIDRecord may be added to the existing type of group resource <Group>. The conMemberIDRecord indicates the associated member record, for example, A+B; 0; B+C; A+C and so on, each association being separated by a semicolon; A+B indicates that members A and B are associated; 0 indicates that there is no member association, that is, the associated member list is empty, indicating that the association is canceled; B+C indicates that members B and C are associated; and A+C indicates that members A and C are associated. Certainly, the manner representing the associated members in the group as described above is merely exemplary and is not intended to be limiting of the principles of the present disclosure. In this way, some of the members included in the group resource may be selected to be associated, so that the associations between the members in the group may be flexibly set, and the needs to uniformly set the associations between all the members in the group may be avoided.

Further, as shown in FIG. 4B, unlike FIG. 4A, the existing type of group resource <group> may not include the resource attribute conEndTime, but may include the association start time record conStartTimeRecord, wherein conStartTimeRecord records the time of each association establishment, for example, T1; T2; T3; T4; . . . .

As a result, the associated members and associated time may be updated by combining the resource attribute conMemberIDrecord with the resource attribute conStartTimeRecord, so that multiple associated relationships may be recorded. As an example, the association start time record conStartTimeRecord may correspond to the associated member record. In the example above, T1 corresponds to A+B, indicating the time at which the association between members A and B is established. T2 corresponds to 0, indicating the time at which the association between members A and B is canceled. T3 corresponds to B+C, indicating the time at which the association between members B and C is established. T4 corresponds to A+C, not only indicating the time at which the association between members A and C is established, but also indicating the time at which the last association is canceled, that is, the time when the association between members B and C is canceled. In this way, it is not necessary to separately set the association end time, but to infer and record the association end time from the association start time list and the associated member list.

As shown in FIG. 4B, the existing type of group resource <group> may further include resource attributes and sub-resources such as memberType, currentNrOfMembers, MaxNrOfMembers, memberIDs, creationTime, consistencyStrategy and <fanOutPoint>. The definition of each resource attribute and sub-resource is the same as described above with reference to FIG. 4A.

Optionally, as shown in FIG. 4B, the resource attribute enable may be added to the existing type of group resource to indicate the validity of the association. When enable is set to true, it indicates that there is a valid association between the members to which the current entry of the resource attribute conMemberIDrecord points, and when enable is set to false, it indicates that there is no valid association between the members to which the current entry of the resource attribute con MemberIDrecord points.

With this type of group resource, the association cancelation may be denoted by adding 0 in the associated member record conMemberIDrecord as the current entry, or the association cancelation may also be denoted by setting enable. Thus, the created group resource may not include the resource attribute enable.

Below, the processes for setting the associations between the respective resources by using the created new type of group resource in accordance with embodiments of the present disclosure will be described in details with reference to FIGS. 5A-6B.

Figure 5A:
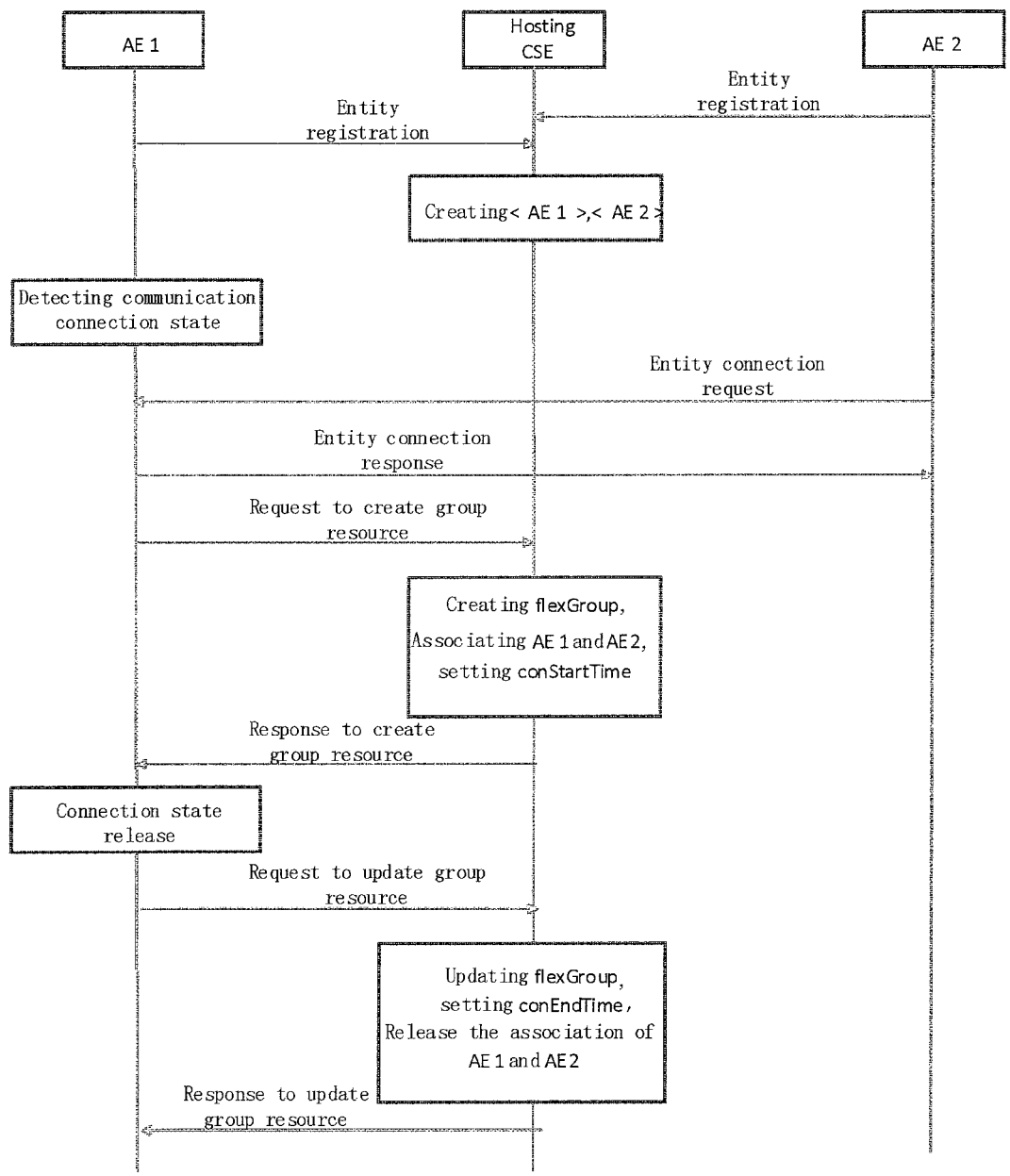
FIGS. 5A-5B schematically illustrate a process for associating a plurality of resources using group resource in accordance with an embodiment of the disclosure.
Figure 5B:
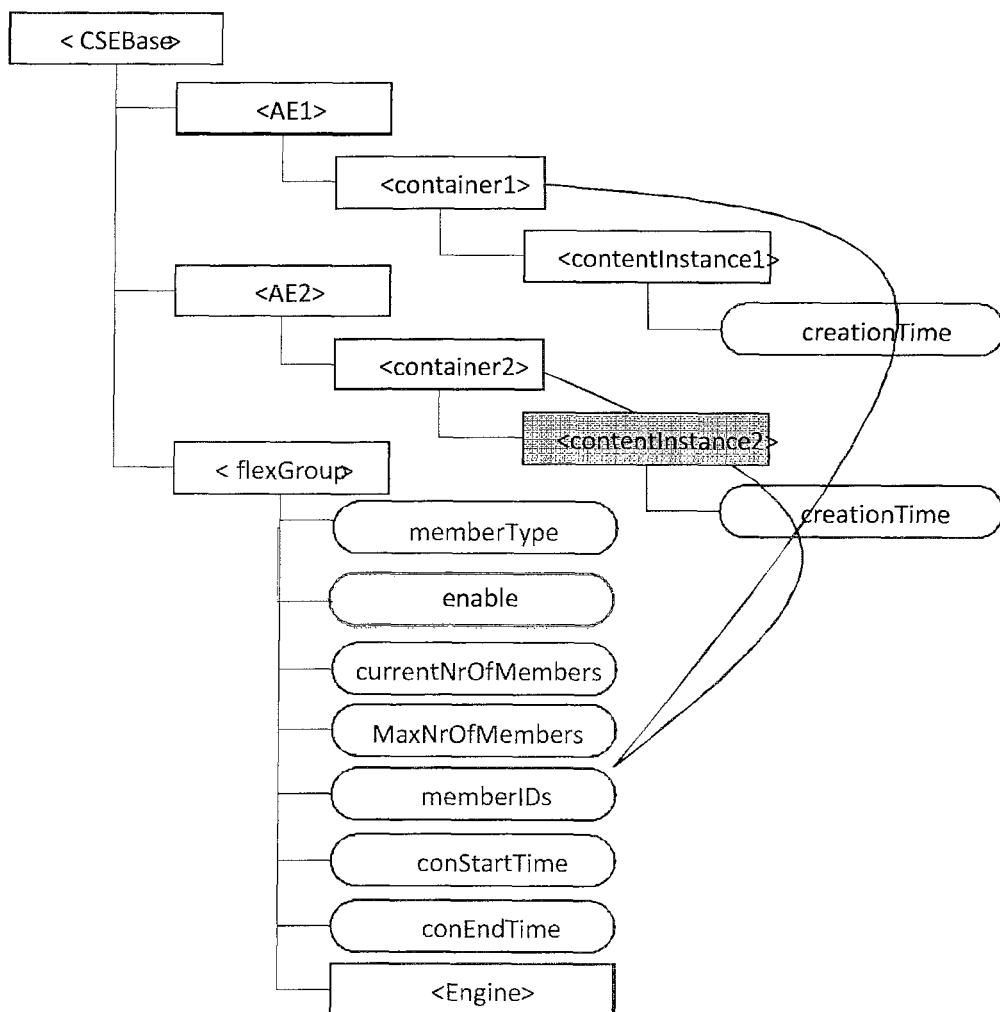

FIGS. 5A-5B illustrate an exemplary process for associating and managing various resources using a new type of group resource as shown in FIG. 3A.

As shown in FIG. 5A, the new type of group resource may be utilized to associate the entities. As shown in FIG. 5A, optionally, entities 1 and 2 (e.g., Application Entities AE1 and AE2) may be respectively registered to a common service entity (e.g., Common Service Entity CSE) to create corresponding resources on the CSE. Here, the entity may represent a software module of a communication device, and the common service entity may represent a software module of a service platform, which may be local or remote. As shown in FIG. 5B, the CSE may create resources <AE1> and <AE2> for AE1 and AE2, respectively, under resource <CSEBase>, and the created resources may include corresponding sub-resources <container1>/<contentInstance1> and <container2>/<contentInstance2>.

AE1 may detect the connection state with other entities in real time or periodically. For example, when a connection request from AE2 is detected, after performing a corresponding permission check, AE1 may send a connection response to AE2 to establish a communication connection with AE2.

In order to associate the resources of AE1 and AE2, as shown in FIG. 5A, optionally, a request for creating a group resource may be sent by the AE1 to the CSE. Certainly, the request for creating a group resource may also be sent by the AE2 to the CSE, which is not limited herein. Upon receiving the request for creating a group resource from AE1 or AE2, the CSE may create a new type of group resource <flexGroup> which includes the resource attributes and sub-resources as described above with reference to FIG. 3A. As shown in FIG. 5B, the member list attribute memberIDs of the group resource <flexGroup> points to <AE1>/<container1> and <AE2>/<container2>, thereby establishing the association of the resources of AE1 and AE2 and setting the association start time conStartTime to the association establishment time to record the association start time of the resources of AE1 and AE2; in addition, currentNrOfMembers is set to 2; MaxNrOfMembers may be set in consideration of the number of members that may later join the group <flexGroup>; and <Engine> may set the rule for calculating or operating the data under <AE1>/<container1> and <AE2>/<container2>.

As shown in FIG. 5A, when AE1 detects the release of the connection state, it may send a request for updating the group resource to the CSE in order to cancel the association with AE2. Similar to the above, the request for updating the group resource may also be initiated by the AE2 to the CSE so as to cancel the association with the AE1, which is not limited herein. Upon receiving the request for updating the group resource from AE1 or AE2, the CSE determines whether the requester satisfies a corresponding permission requirement. If the corresponding permission requirement is satisfied, the CSE updates the group resource <flexGroup> in order to cancel the association of AE1 and AE2. As described above with reference to FIG. 3A, the CSE may cancel the association of AE1 and AE2 by setting the resource attribute enable to false, or the CSE may set the association end time conEndTime, so that the time at which the association between AE1 and AE2 is canceled may be set, so as to complete the request for updating the group resource and send an update completed response to the originator of the update request.

In this way, a plurality of resources may be associated by using a group resource, and the plurality of resources may belong to one or more entities (the entity may be a physical device or a logical device). When the entity to which the plurality of resources belong has connection (including wired connection, wireless connection, especially wireless personal area network connection), the plurality of resources may be associated and the association may be canceled according to the request of any entity. This not only improves the ability of comprehensively analyzing multiple resource data, but also has the flexibility to set the associations between the various entities, and can adjust the resource data to be comprehensively analyzed at any time.

Figure 6A:
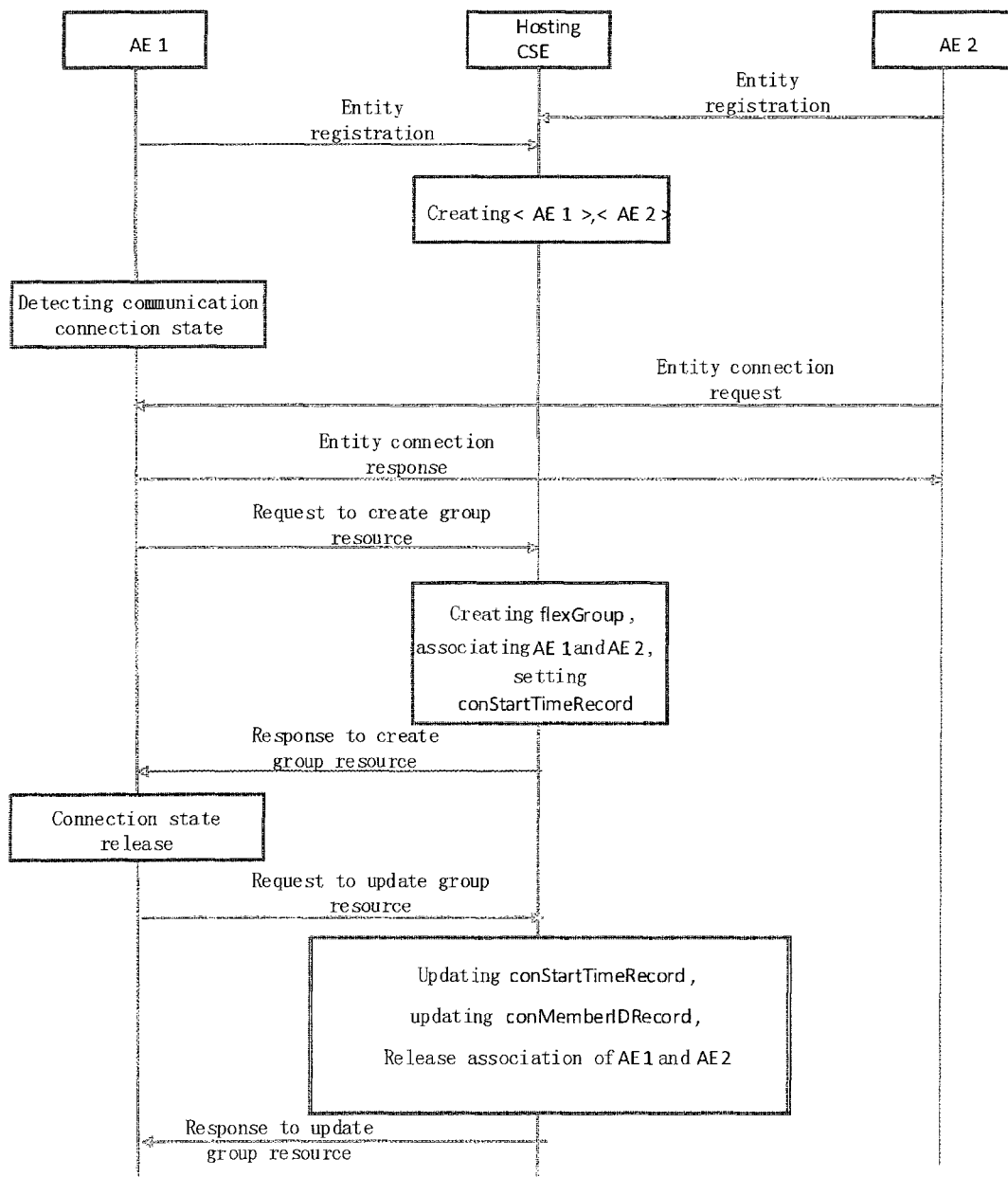
FIGS. 6A-6B schematically illustrate another process for associating a plurality of resources using group resource in accordance with an embodiment of the disclosure.
Figure 6B:
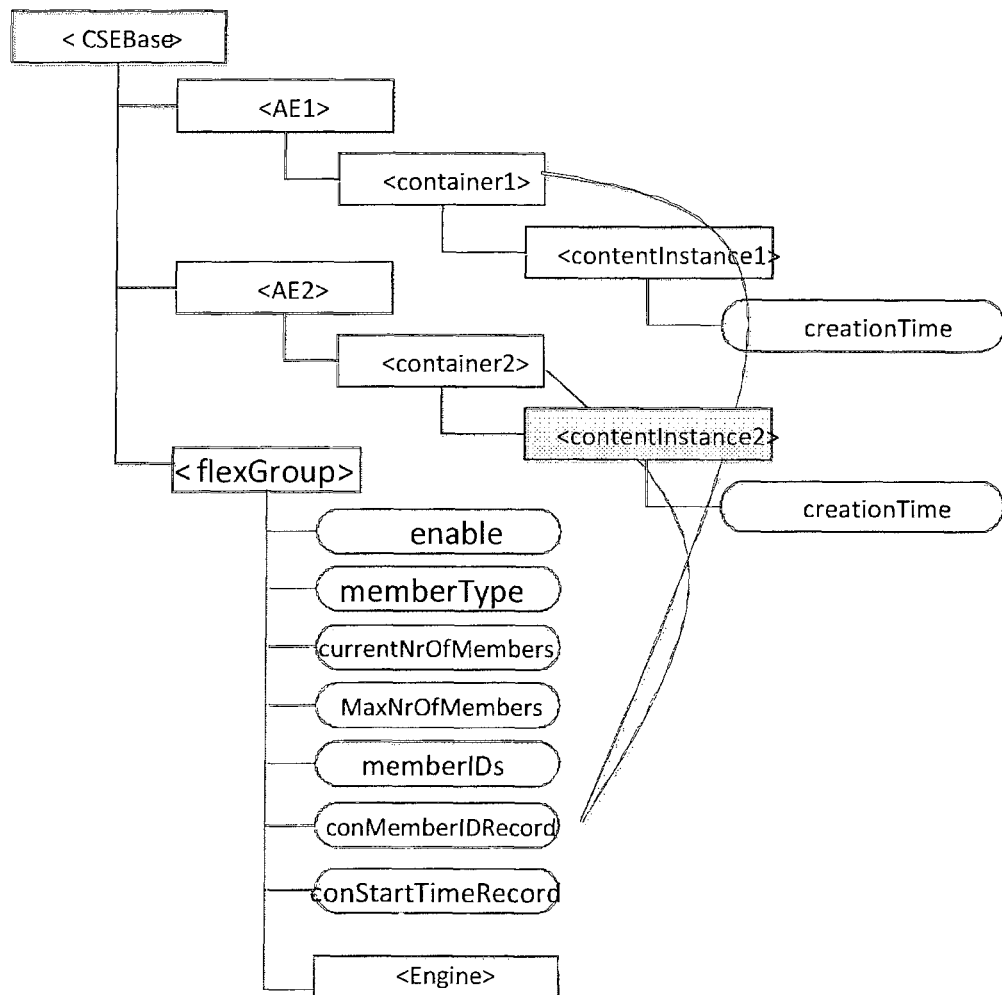

FIGS. 6A-6B illustrate an exemplary process for associating and managing various resources using a new type of group resource as shown in FIG. 3B.

As shown in FIG. 6A, the new type of group resource may be utilized to associate the entities. Optionally, entities 1 and 2 (e.g., Application Entities AE1 and AE2) may be respectively registered to a common service entity (e.g., Common Service Entity CSE) to create corresponding resources on the CSE. As described above, the entity may represent a software module of a communication device, and the common service entity may represent a software module of a service platform, which may be local or remote. As shown in FIG. 6B, the CSE may create resources <AE1> and <AE2> for AE1 and AE2, respectively, under resource <CSEBase>, and the created resources may include corresponding sub-resources <container1>/<contentInstance1> and <container2>/<contentInstance2>.

AE1 may detect the connection state with other entities in real time or periodically. For example, when a connection request from AE2 is detected, after performing a corresponding permission check, AE1 may send a connection response to AE2 to establish a communication connection with AE2.

In order to associate the resources of AE1 and AE2, as shown in FIG. 6A, optionally, a request for creating a group resource may be sent by the AE1 to the CSE. Certainly, the request for creating a group resource may also be sent by the AE2 to the CSE, which is not limited herein. Upon receiving the request for creating a group resource from AE1 or AE2, the CSE may create a new type of group resource <flexGroup> which includes the resource attributes and sub-resources as described above with reference to FIG. 3B. As shown in FIG. 6B, the associated members AE1+AE2 may be added to the associated member record conMemberIDRecord of the group resource <flexGroup>, thereby establishing the association of the resources of AE1 and AE2 and adding the current time to conStartTimeRecord as the association establishment time to record the association start time of the resources of AE1 and AE2; in addition, currentNrOfMembers is set to 2; MaxNrOfMembers may be set in consideration of the number of members that may later join the group <flexGroup>; and <Engine> may set the rule for calculating or operating the data under <AE1>/<container1> and <AE2>/<container2>.

As shown in FIG. 6A, when AE1 detects the release of the connection state, it may send a request for updating the group resource to the CSE in order to cancel the association with AE2. Similar to the above, the request for updating the group resource may also be initiated by the AE2 to the CSE so as to cancel the association with the AE1, which is not limited herein. Upon receiving the request for updating the group resource from AE1 or AE2, the CSE determines whether the requester satisfies a corresponding permission requirement. If the corresponding permission requirement is satisfied, the CSE updates the group resource <flexGroup> in order to cancel the association of AE1 and AE2. As described above with reference to FIG. 3B, the CSE may cancel the association of AE1 and AE2 by setting the resource attribute enable to false, or the CSE may add 0 to the associated member record conMemberIDrecord as the current entry to cancel the association, and record corresponding time in the association start time record conStartTimeRecord to indicate the time at which the association is canceled, so as to complete the request for updating the group resource and send an update completed response to the originator of the update request.

In addition, if the association relationship of entities is updated, for example, to establish the association of AE1 with AE3, according to this embodiment, a request for updating the group resource may be sent by AE1 or AE3 to the CSE so as to cancel the association of AE1 with AE2 and establish the association of AE1 with AE3; upon receiving the request for updating the group resource from AE1 or AE3, the CSE may update the group resource <flexGroup> after optionally performing an appropriate permission authentication. For example, a new associated member record may be added in the associated member record conMemberIDrecord, e.g., AE1+AE3, thereby canceling the association of AE1+AE2 and recording the corresponding time in the association start time record conStartTimeRecord to indicate the time at which the association of AE1 and AE3 is established, and as described above, this recorded time also indicates the time at which the association of AE1 and AE2 is canceled, thereby completing the request for updating the group resource and sending an update completed response to the originator of the update request.

In this way, a plurality of association relationships may be recorded by using one group resource structure, so that the association relationships of the entity resources may be updated according to the request of the entity. This not only improves the ability of comprehensively analyzing the resource data of entities, but also has the flexibility to set the associations between the various entities, and can adjust the resource data to be comprehensively analyzed at any time.

In the embodiments described above with reference to FIGS. 5A and 6A, it is described that the entities to be associated are first registered to the common service entity and then the connection states therebetween are detected. For example, it can be detected whether an entity is on the same wireless network as the entity to be associated, for example, on the same wireless personal area network (WPAN); optionally, it can be detected whether there is a wired connection to the other entity. For example, the principles of the present disclosure may also be implemented in the case of a cable connection, which is not limited herein.

However, after detecting the connection state, when establishing the association, the entities to be associated may be registered on the common service entity and a group resource may be created to associate the entities. Therefore, the sequence shown in FIG. 5A and FIG. 6A is not necessary, but may be adjusted according to the actual situation, which is not limited herein.

According to another embodiment of the present disclosure, the associations of a plurality of resources may also be achieved by using a way of adding corresponding attributes on the basis of the modified existing group resources as shown in FIGS. 4A and 4B.

Below, the way of associating a plurality of resources by adding corresponding resource attributes on the basis of the modified existing group resources in accordance with another embodiment of the present disclosure will be described with reference to FIGS. 7A and 4A. The main difference from the situation shown in FIG. 5A is that in the situation shown in FIG. 7A, the structure of the group resource created on the common service entity CSE in response to a request for creating the group resource from AE1 or AE2 is actually based on the existing group resource structure with the resource attributes added thereto: the association start time conStartTime and the association end time conEndTime, as shown in FIG. 7B; wherein conStartTime indicates the time when the association is established, and conEndTime indicates the time when the association is canceled.

Figure 7A:
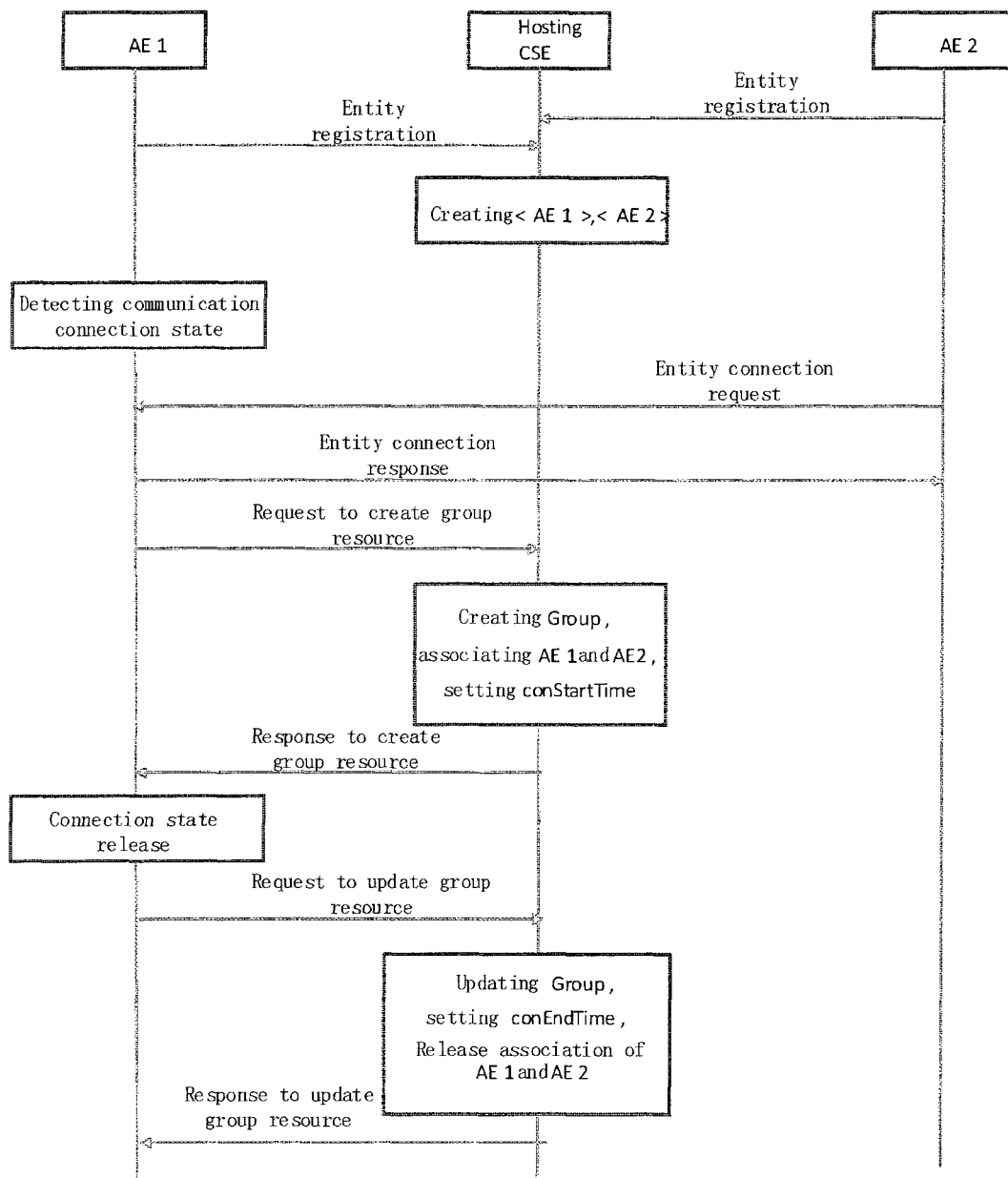
FIGS. 7A-7B schematically illustrate another process for associating a plurality of resources using group resource in accordance with an embodiment of the disclosure.
Figure 7B:
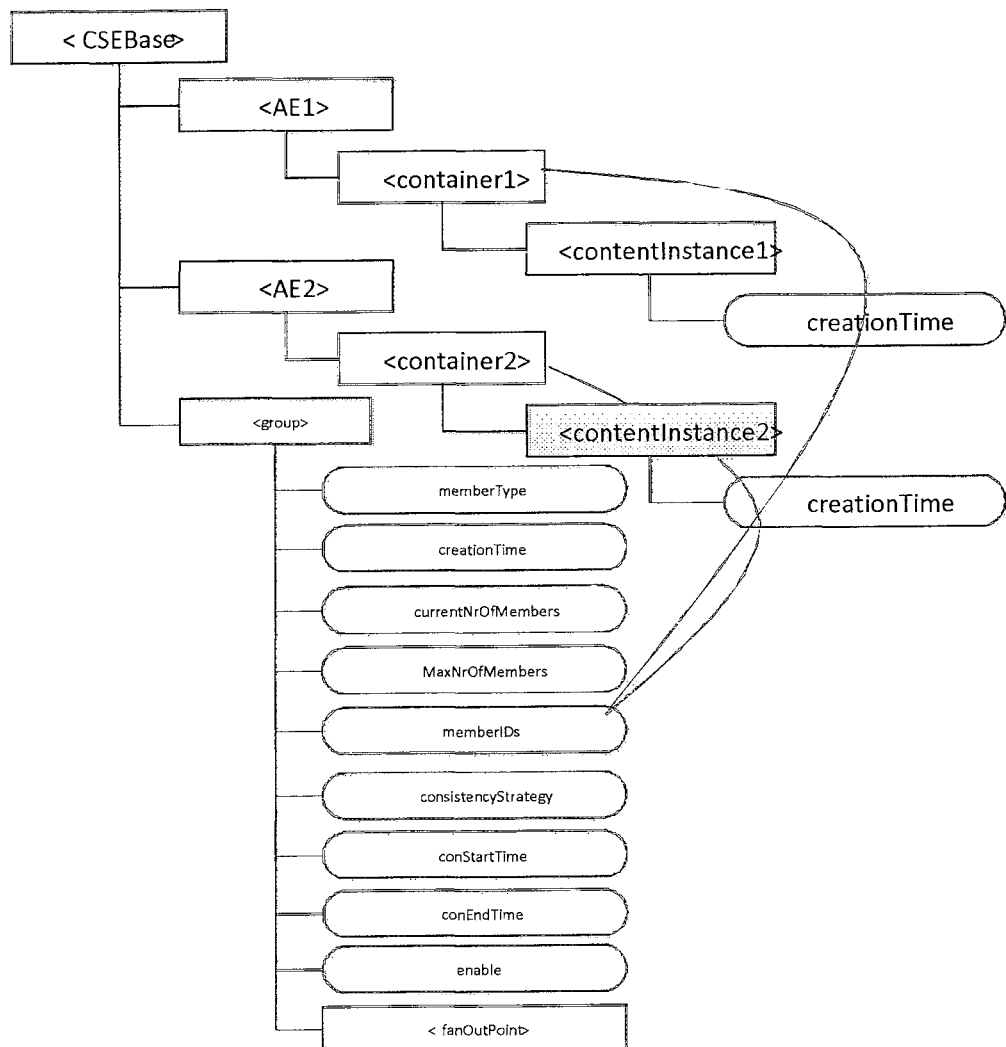

Optionally, as shown in FIG. 7B, the resource attribute enable may also be added on the existing group resource structure to indicate the validity of the association. When enable is set to true, it indicates that there is a valid association between the members to which the resource attribute memberIDs points, and when enable is set to false, it indicates that there is no valid association between the members to which the resource attribute memberIDs points.

Actually, in the embodiment shown in FIG. 7A, the structure of the created group resource is based on the existing group resource <group>, and the resource attributes and sub-resources relating to the associated operation are added therein. As shown in FIG. 7B, the operations of other existing resource attributes are included in the group resource <group> created on the CSE. For example, the resource attribute creationTime indicates the time when the group is created, and its value is assigned by the system when the group is created and cannot be changed; consistencyStrategy indicates how to process the group if the memberType verification fails; the sub-resource <fanOutPoint> belongs to the virtual resource, and if a request is sent to the sub-resource <fanOutPoint>, the request is forwarded to each member in the group indicated by memberIDs, and then the response from each member is aggregated and returned to the originator. The details thereof are not repeated here. Therefore, for the operation steps involved in FIG. 7A, reference may be made to the detailed description of the steps shown in FIG. 5A.

Below, the way of associating a plurality of resources by adding corresponding resource attributes on the basis of the modified existing group resource structure in accordance with another embodiment of the present disclosure will be described with reference to FIGS. 8A and 4B. The main difference from the situation shown in FIG. 6A is that in the situation shown in FIG. 8A, the structure of the group resource created on the common service entity CSE in response to a request for creating the group resource from AE1 or AE2 is actually based on the existing group resource structure as shown in FIG. 8B, and the resource attribute conMemberIDRecord is added to the existing group resource <Group>; wherein conMemberIDRecord indicates the associated member record, for example, A+B; 0; B+C; A+C and so on, each association being separated by a semicolon; A+B indicates that members A and B are associated; 0 indicates that there is no member association, that is, the associated member list is empty, indicating that the association is canceled; B+C indicates that members B and C are associated; and A+C indicates that members A and C are associated. Certainly, the manner representing the associated members in the group as described above is merely exemplary and is not intended to be limiting of the principles of the present disclosure. In this way, some of the members included in the group resource may be selected to be associated, so that the associations between the members in the group may be flexibly set, and the needs to uniformly set the associations between all the members in the group may be avoided.

Further, as shown in FIG. 8B, unlike FIG. 7B, the existing group resource <group> may not include the resource attribute conEndTime, but may include the association start time record conStartTimeRecord, wherein conStartTimeRecord records the time of each association establishment, for example, T1; T2; T3; T4; . . . .

As described above, the associated members and associated time may be updated by combining the resource attribute conMemberIDRecord with the resource attribute conStartTimeRecord, so that multiple associated relationships may be recorded. As an example, the association start time record conStartTimeRecord may correspond to the associated member record. In the example above, T1 corresponds to A+B, indicating the time at which the association between members A and B is established. T2 corresponds to 0, indicating the time at which the association between members A and B is canceled. T3 corresponds to B+C, indicating the time at which the association between members B and C is established. T4 corresponds to A+C, not only indicating the time at which the association between members A and C is established, but also indicating the time at which the last association is canceled, that is, the time when the association between members B and C is canceled. In this way, it is not necessary to separately set the association end time, but to infer and record the association end time from the association start time list and the associated member list.

Additionally, as shown in FIG. 8B, the existing type of group resource <group> may further include resource attributes and sub-resources such as memberType, currentNrOfMembers, MaxNrOfMembers, memberIDs, creationTime, consistencyStrategy and <fanOutPoint>. The definition of each resource attribute is the same as described above with reference to FIG. 4B.

Optionally, as shown in FIG. 8B, the resource attribute enable may also be added into the group resource to indicate the validity of the association. When enable is set to true, it indicates that there is a valid association between the members to which the current entry of the resource attribute conMemberIDrecord points, and when enable is set to false, it indicates that there is no valid association between the members to which the current entry of the resource attribute conMemberIDrecord points.

Figure 8A:
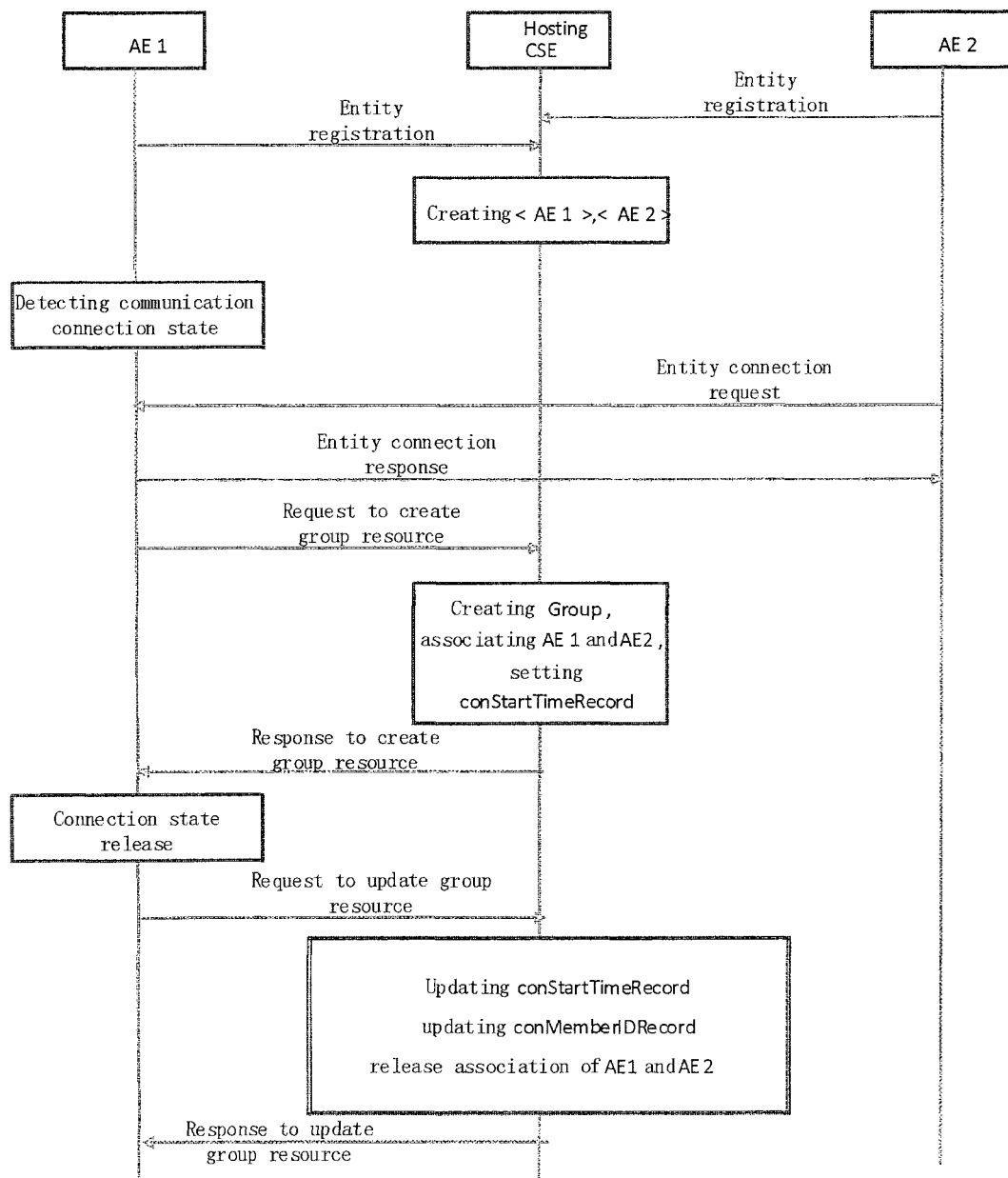
FIGS. 8A-8B schematically illustrate another process for associating a plurality of resources using group resource in accordance with an embodiment of the disclosure.
Figure 8B:
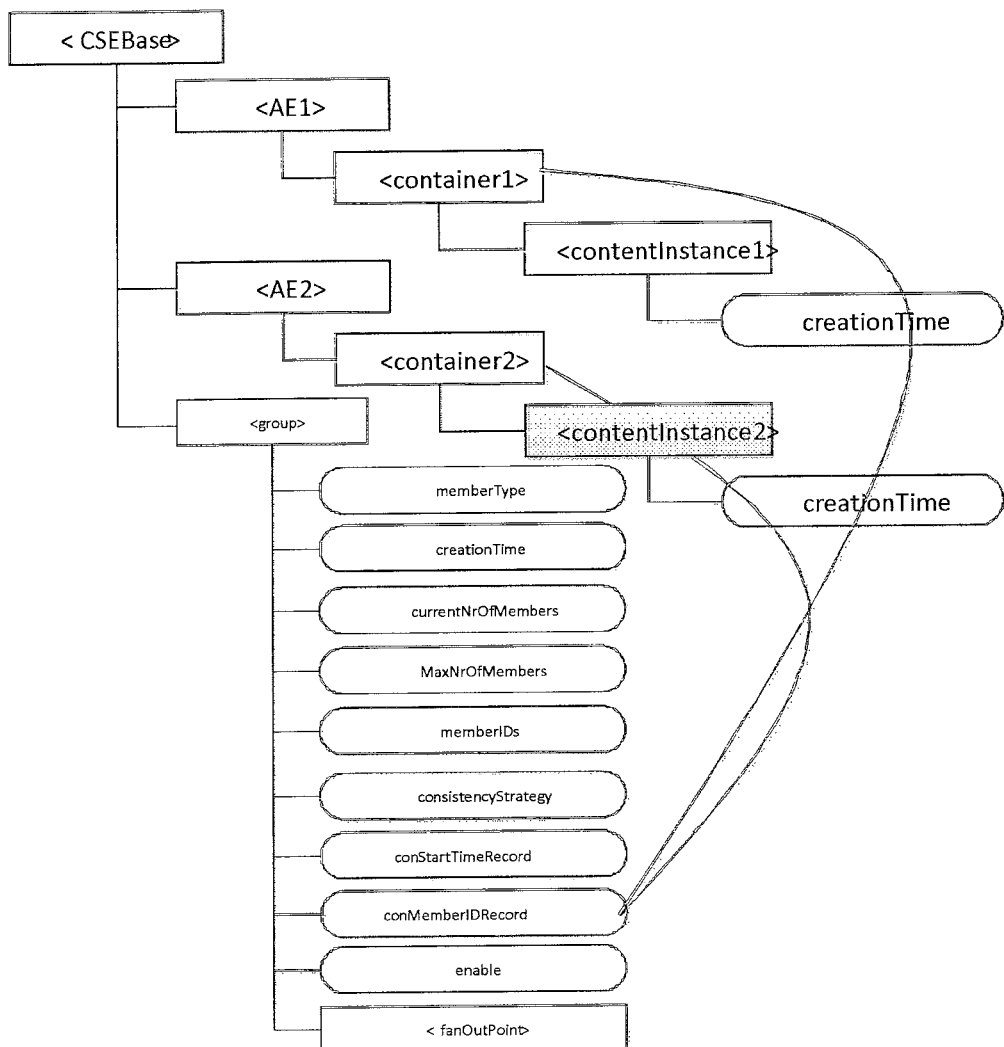

Actually, in the embodiment shown in FIG. 8A, the structure of the created group resource is based on the existing group resource <group>, and the resource attributes relating to the associated operation are added therein. Therefore, for the operation steps involved in FIG. 8A, reference may be made to the detailed description of the steps shown in FIG. 6A. The details thereof are not repeated here.

The exemplary description of associating individual entity resources with the created group resource and updating the association of entity resources in accordance with the principles of the present disclosure has been given above in conjunction with FIGS. 5A-8B.

The specific situations to which the principle of the present disclosure may be applied will be further described below in conjunction with specific examples. For example, when a user can exercise at home by using a treadmill, the user can wear a smart bracelet for monitoring physiological parameters such as heart rate and blood pressure, and use the treadmill to record movement-related parameters such as number of steps, speed, energy consumed, and slope. For example, software for monitoring a user's physiological parameters may be installed on the smart bracelet, which may be considered as the application entity AE1 shown in FIGS. 5A-8B, and software installed on the treadmill to record the user's exercise parameters may be considered as the application entity AE2 shown in FIGS. 5A-8B. When the user starts exercising, the smart bracelet and the treadmill may establish a wireless personal area network (WPAN) by connecting to each other. Before or after the establishment of the wireless personal area network, the AE1 in the smart bracelet and the AE2 in the treadmill may be respectively registered to a common service entity CSE to set up corresponding resources such as <AE1>/<container1> and <AE2>/<container2>. The common service entity may represent a software module on a common service platform for analyzing the user's healthy, and the common service platform may be, for example, application software installed on the user's smartphone or may be service software installed on a remote server connected through a gateway/router in the user's home. After establishing the WPAN, the AE1 of the smart bracelet may initiate a request to create a group resource to the common service entity to associate the resources of the AE1 of the smart bracelet and the AE2 of the treadmill, so that the monitored user's physiological parameters may be associated with the user's exercise parameters recorded by the treadmill. Specifically, upon receiving a request for creating a group resource from the AE1 of the smart bracelet, the common service entity may perform device identity verification. After the verification is passed, a corresponding group resource may be created, and the created group resource may be the new type of group resource <FlexGroup> described above with reference to FIGS. 5A-6B, or may also be the group resource obtained by adding the corresponding resource attributes and sub-resources on the basis of the structure of the existing group resource <group> as described above with reference to FIGS. 7A-8B.

When the created group resource includes the resource attributes: the association start time conStartTime and the association end time conEndTime, the time at which the AE1 of the smart bracelet is associated with the AE2 of the treadmill is recorded in the association start time, that is, the time when the user starts exercising, and the resource attribute memberIDs point to AE1 and AE2, respectively. When the user completes this exercise, a request for updating the group resource may be sent by the smart bracelet to the common service entity so as to cancel the association between AE1 of the smart bracelet and AE2 of the treadmill. Upon receiving the request for updating the group resource, the common service entity may set the association end time conEndTime to the current time in order to cancel the association. Certainly, as mentioned above, the resource attribute enable may also be set to false, so as to cancel the current association, and the association end time conEndTime may be set to the current time, so as to record the duration of this exercise by the user. In the case that a new type of group resource is created, specific operation algorithms or rules may be set at <Engine> when <FlexGroup> is created. For example, the relationship between physiological parameters and exercise parameters of the user during this exercise period is analyzed and recorded, historical records are compared, and a relational model is established, so as to analyze whether the user's exercise amount is appropriate and provide suggestions for the user's next exercise.

When the created group resource does not include the association end time conEndTime but includes the association start time record conStartTimeRecord and the associated member record conMemberIDrecord, multiple association relationships may be recorded under one group resource structure. For example, the time when AE1 of the smart bracelet is associated with AE2 of the treadmill is recorded in the association start time record conStartTimeRecord, that is, adding the time when the user starts this exercise. And AE1+AE2 are added in the associated member record conMemberIDrecord as the current entry. When the user completes this exercise, a request for updating the group resource may be sent by the smart bracelet to the common service entity so as to cancel the association between AE1 of the smart bracelet and AE2 of the treadmill. Upon receiving the request for updating the group resource, the common service entity may add a value of 0 to the associated member record conMemberIDrecord as the current entry, in order to cancel the association of the smart bracelet and the treadmill. And the current time may be added to the association start time record conStartTimeRecord as the end time of this exercise, so as to record the duration of this exercise by the user.

The implementation of the principles of the present disclosure is schematically described above in connection with the wireless personal area network. The implementation of the principles of the present disclosure is further described below in connection with wired connections. For example, with the growing popularity of electric vehicles, electric vehicles need to be charged with charging piles.

When the cable is connected to start charging the vehicle, the vehicle and the charging pile may establish a communication connection. Further, AE1 of the vehicle and AE2 of the charging pile may be respectively registered to a common service entity CSE to set up corresponding resources such as <AE1>/<container1> and <AE2>/<container2>. The common service entity may represent a software module on a common service platform for analyzing the relationships between the battery status of the user's vehicle, the charging history record and the driving data of the vehicle, and the common service platform may be, for example, application software installed on the user's smartphone or may be service software installed on a remote server connected through the smartphone. After establishing the cable connection between the vehicle and the charging pile, AE1 of the vehicle may initiate a request to create a group resource to the common service entity to associate the resources of AE1 of the vehicle and AE2 of the charging pile, so that the data such as driving data, battery status, charging times of the vehicle may be associated with the parameters such as voltage, current and power output by the charging pile. Specifically, upon receiving a request for creating a group resource from AE1 of the vehicle, the common service entity may perform device identity verification. After the verification is passed, a corresponding group resource may be created, and the created group resource may be the new type of group resource <FlexGroup> described above with reference to FIGS. 5A-6B, or may also be the group resource obtained by adding the corresponding resource attributes on the basis of the structure of the existing group resource <group> as described above with reference to FIGS. 7A-8B.

When the created group resource includes the resource attributes: the association start time conStartTime and the association end time conEndTime, the time at which the AE1 of the vehicle is associated with the AE2 of the charging pile is recorded in the association start time, that is, the time when the charging starts, and the resource attribute memberIDs point to AE1 and AE2, respectively. When the user completes this charging, a request for updating the group resource may be sent by the vehicle to the common service entity so as to cancel the association between AE1 of the vehicle and AE2 of the charging pile. Upon receiving the request for updating the group resource, the common service entity may set the association end time conEndTime to the current time in order to cancel the association. Certainly, as mentioned above, the resource attribute enable may also be set to false, so as to cancel the current association, and the group resource is not available at this time, that is, the association of AE1 and AE2 is not available. Optionally, the common service entity may set the association end time conEndTime to the time when enable is set to false, so as to record the duration of this charging. In the case that a new type of group resource is created, specific operation algorithms or rules may be set at <Engine> when <FlexGroup> is created. For example, the relationship between the change in the battery status and the change in the charging time during this charging period is analyzed and recorded, historical records are compared, and a relational model is established, so as to analyze whether the vehicle's battery needs maintenance and provide a corresponding suggestion.

When the created group resource does not include the association end time conEndTime but includes the association start time record conStartTimeRecord and the associated member record conMemberIDrecord, multiple association relationships may be recorded under one group resource structure. For example, the time when AE1 of the vehicle is associated with AE2 of the charging pile is added in the association start time record conStartTimeRecord, that is, adding the time when this charging starts. And AE1+AE2 are added in the associated member record conMemberIDrecord as the current entry. When this charging completes, a request for updating the group resource may be sent by AE1 of the vehicle to the common service entity so as to cancel the association between AE1 of the vehicle and AE2 of the charging pile. Upon receiving the request for updating the group resource, the common service entity may add a value of 0 to the associated member record conMemberIDrecord as the current entry, in order to cancel the association of AE1 of the vehicle and AE2 of the charging pile. And the current time may be added to the association start time record conStartTimeRecord as the end time of this charging, so as to record the duration of this charging.

The embodiments of the present disclosure that enables the association of the respective resources with the created group resource is exemplarily described above. According to another aspect of the present disclosure, the structure of the entity resource itself may also be modified to realize the association of each resource.

Figure 9A:
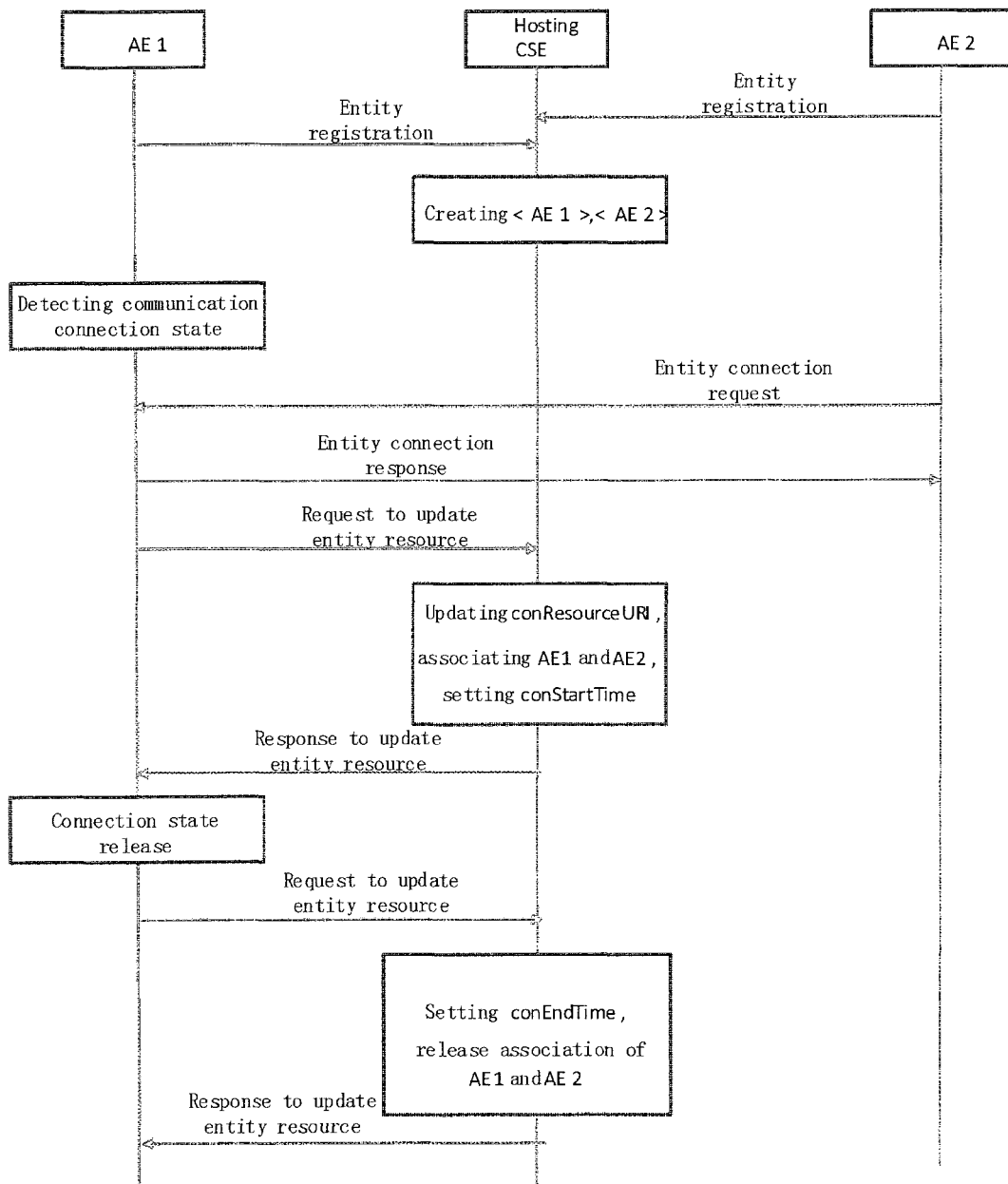
FIGS. 9A-9B schematically illustrate a process for associating a plurality of resources using an entity resource in accordance with an embodiment of the disclosure.
Figure 9B:
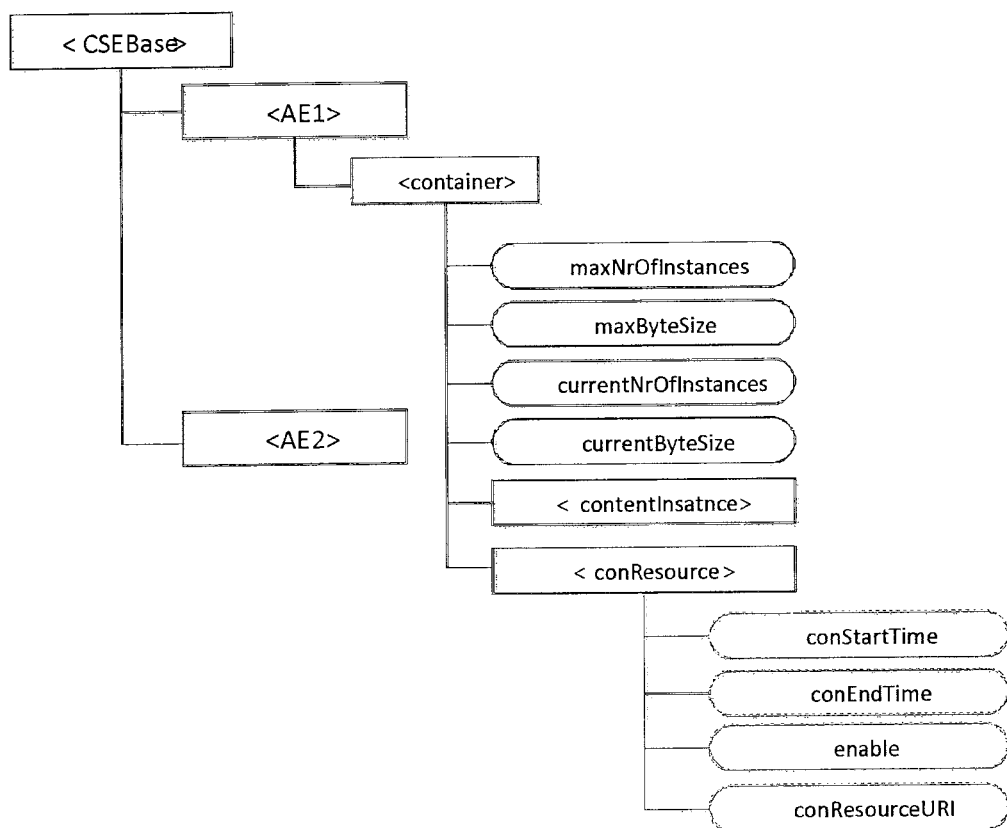

As shown in FIG. 9B, a new sub-resource <conResource> may be added under <AE>/<container> when an AE is registered to a common service entity CSE, wherein the resource attributes are established under the sub-resource: the association start time conStartTime and the associated end time conEndTime; and wherein conStartTime indicates the time when the association is established, and conEndTime indicates the time when the association is canceled.

Optionally, as shown in FIG. 9B, the new sub-resource <conResource> may further include a resource attribute: the associated member list conResourceURI to point to other AEs to which the AE1 is associated.

Optionally, as shown in FIG. 9B, the new sub-resource <conResource> may further include the resource attribute enable to indicate the validity of the association. When enable is set to true, it indicates that there is a valid association with other AEs to which the resource attribute conResourceURI points, and when enable is set to false, it indicates that there is no valid association with other AEs to which the resource attribute conResourceURI points.

With this type of AE resource, the association cancelation may be denoted by setting conEndTime, or the association cancelation may also be denoted by setting enable. Thus, the created AE resource may optionally include the resource attribute enable.

Figure 10A:
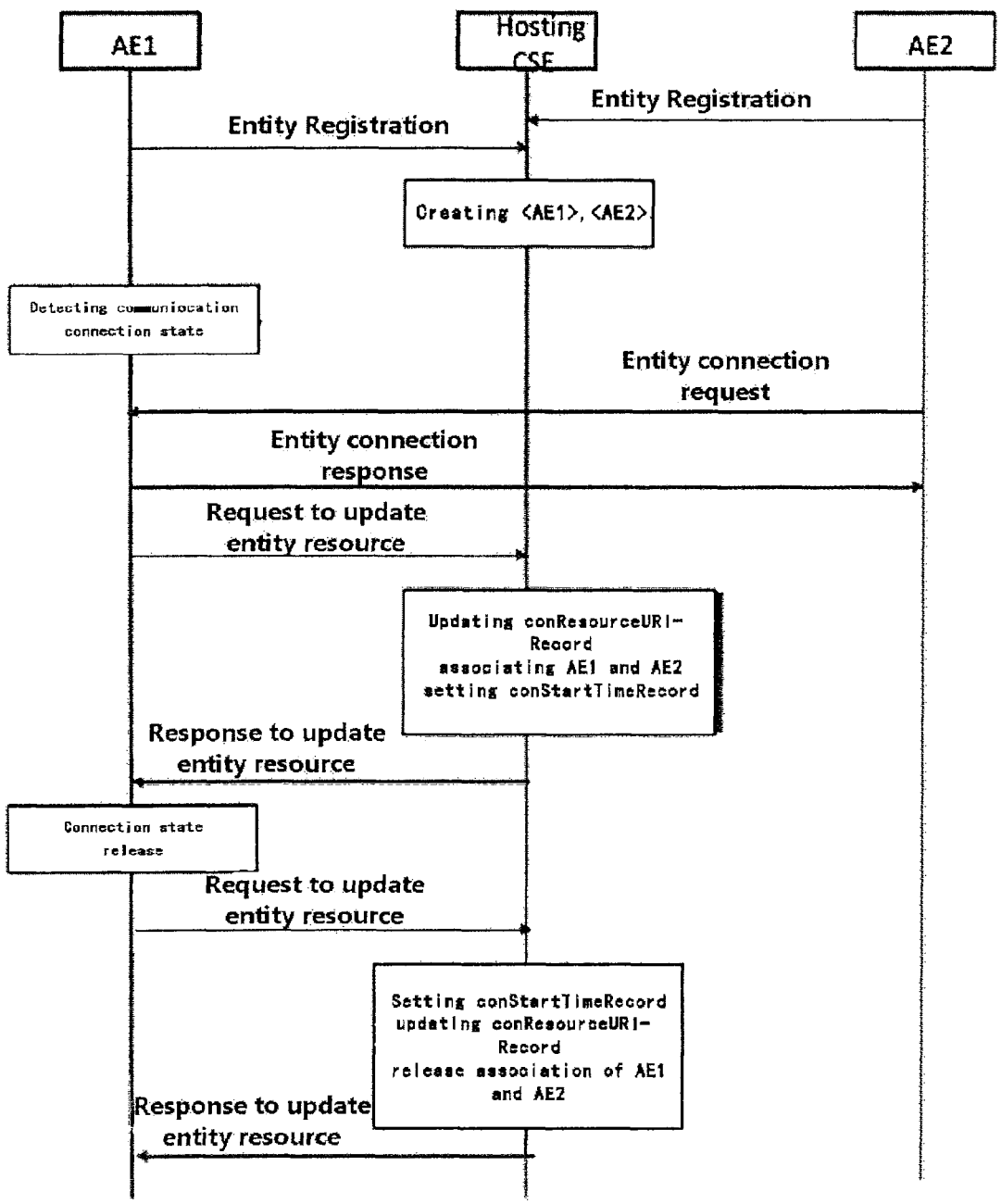
FIGS. 10A-10B schematically illustrate another process for associating a plurality of resources using an entity resource in accordance with an embodiment of the disclosure.
Figure 10B:
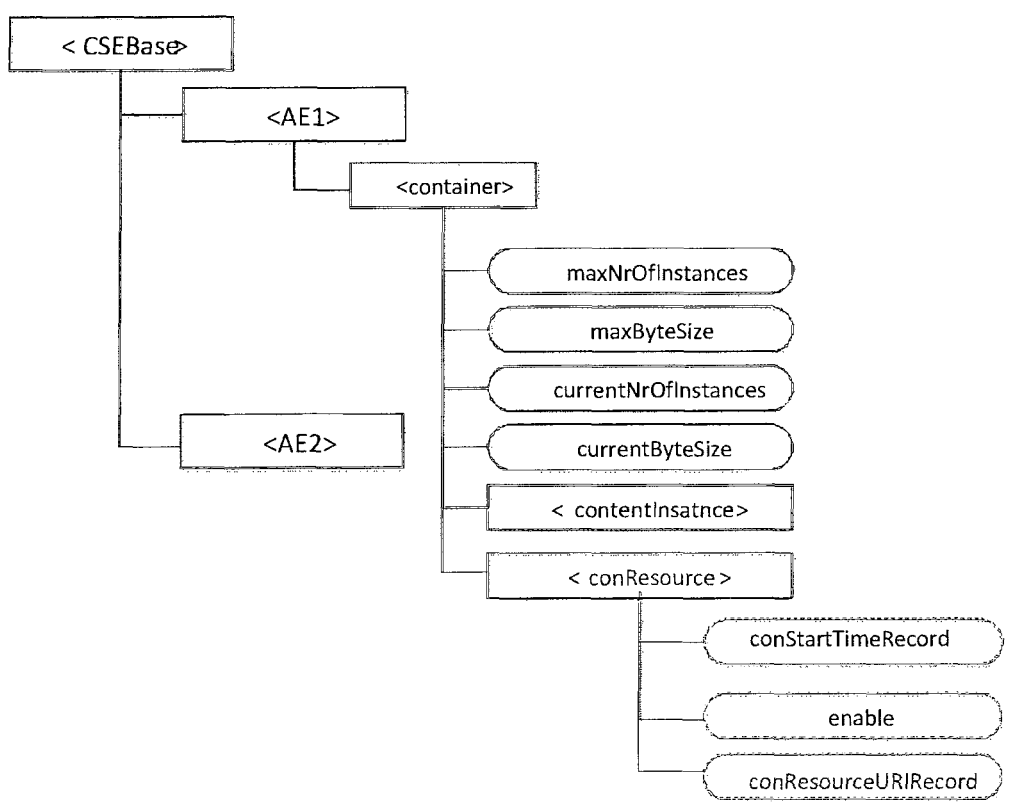

As a variant, as shown in FIG. 10B, a new sub-resource <conResource> may be added under an existing AE resource <AE>/<container>, and a resource attribute may be added under the sub-resource: the associated member record conResourceURIRecord. conResourceURIRecord indicates the associated member record, for example, A+B; 0; B+C; A+C and so on, each association being separated by a semicolon; A+B indicates that members A and B are associated; 0 indicates that there is no member association, that is, the associated member list is empty, indicating that the association is canceled; B+C indicates that members B and C are associated; and A+C indicates that members A and C are associated. Certainly, the manner representing the associated members as described above is merely exemplary and is not intended to be limiting of the principles of the present disclosure.

Further, as shown in FIG. 10B, unlike FIG. 9B, the sub-resource <conResource> may not include the resource attribute conEndTime, but may include the association start time record conStartTimeRecord, wherein conStartTimeRecord records the time of each association establishment, for example, T1; T2; T3; T4; . . . .

As a result, the associated members and associated time may be updated by combining the resource attribute conResourceURIRecord with the resource attribute conStartTimeRecord, so that multiple associated relationships may be recorded. As an example, the association start time record conStartTimeRecord may correspond to the associated member record. In the example above, T1 corresponds to A+B, indicating the time at which the association between members A and B is established. T2 corresponds to 0, indicating the time at which the association between members A and B is canceled. T3 corresponds to B+C, indicating the time at which the association between members B and C is established. T4 corresponds to A+C, not only indicating the time at which the association between members A and C is established, but also indicating the time at which the last association is canceled, that is, the time when the association between members B and C is canceled. In this way, it is not necessary to separately set the association end time, but to infer and record the association end time from the association start time list and the associated member list.

Optionally, as shown in FIG. 10B, the resource attribute enable may be also added to indicate the validity of the association. When enable is set to true, it indicates that there is a valid association between the members to which the current entry of the resource attribute conResourceURIRecord points, and when enable is set to false, it indicates that there is no valid association between the members to which the current entry of the resource attribute conResourceURIRecord points.

With this type of AE resource, the association cancelation may be denoted by adding 0 in the associated member record conResourceURIRecord as the current entry, or the association cancelation may also be denoted by setting enable. Thus, the created AE resource may not include the resource attribute enable.

Below, the way of associating a plurality of resources according to the established AE resource will be described briefly with reference to FIG. 9A. The main difference of FIG. 9A in compared with the situation shown in FIG. 5A lies in the updating of entity resources.

As shown in FIG. 9A, in order to associate the resources of AE1 and AE2, a request for updating the AE resource may be sent by the AE1 to the CSE. Certainly, the request for updating the AE resource may also be sent by the AE2 to the CSE, which is not limited herein. Upon receiving the update request from AE1 or AE2, the CSE may set conResourceURI of AE1 to point to AE2 so as to establish the association of resources of AE1 and AE2, and set the association start time conStartTime to the association establishment time so as to record the association start time of AE1 and AE2 resources.

As shown in FIG. 9A, when AE1 detects the release of the connection state, it may send a request for updating the AE resource to the CSE in order to cancel the association with AE2. Similar to the above, the update request may also be initiated by the AE2 to the CSE so as to cancel the association with the AE1, which is not limited herein. Upon receiving the update request from AE1 or AE2, the CSE determines whether the request is to release the association. If the association is to be released, the CSE may cancel the association of AE1 and AE2 by setting enable to false. Optionally, the CSE may set the association end time conEndTime, so that the time at which the association between AE1 and AE2 is canceled may be set, so as to complete the update request and send an update completed response to the originator of the update request.

Although the entity's registration and the entity resources updating are illustrated as separate operations in FIG. 9A, in practice, the association state may also be set upon registration, for example, by setting the conResourceURI and the association start time conStartTime to complete the association.

As a variant, for example, as shown in FIG. 10A, upon receiving the update request from AE1 or AE2, the CSE may add the associated members AE1+AE2 in the associated member record conResourceURIRecord of AE1 so as to establish the association of the resources of AE1 and AE2, and may add the current time in the association start time record conStartTimeRecord as the association establishment time so as to record the association start time of AE1 and AE2 resources.

As shown in FIG. 10A, when AE1 detects the release of the connection state, it may send a request for updating the AE resource to the CSE in order to cancel the association with AE2. Similar to the above, the update request may also be initiated by the AE2 to the CSE so as to cancel the association with the AE1, which is not limited herein. Upon receiving the update request from AE1 or AE2, the CSE determines whether the request is to release the association. If the association is to be released, the CSE may cancel the association of AE1 and AE2 by setting enable to false. Alternatively, the CSE may add a value of 0 in the associated member record conResourceURIRecord to cancel the association of AE1 and AE2, and record the corresponding time in the association start time record conStartTimeRecord to indicate the time when the association is canceled, so as to complete the update request and send an update completed response to the originator of the update request.

The processes for associating respective entity resources with the registered AE resources and updating the association of entity resources according to the principles of the present disclosure is exemplarily described above in conjunction with FIGS. 9A-10B.

For the above examples regarding the smart bracelet/the treadmill and the electric vehicle/the charging pile, the above processes for associating and managing entity resources with the registered AE resources may also be used, the details of which may be obtained with reference to FIGS. 9A-10B and thus will not be repeated.

Figure 11:
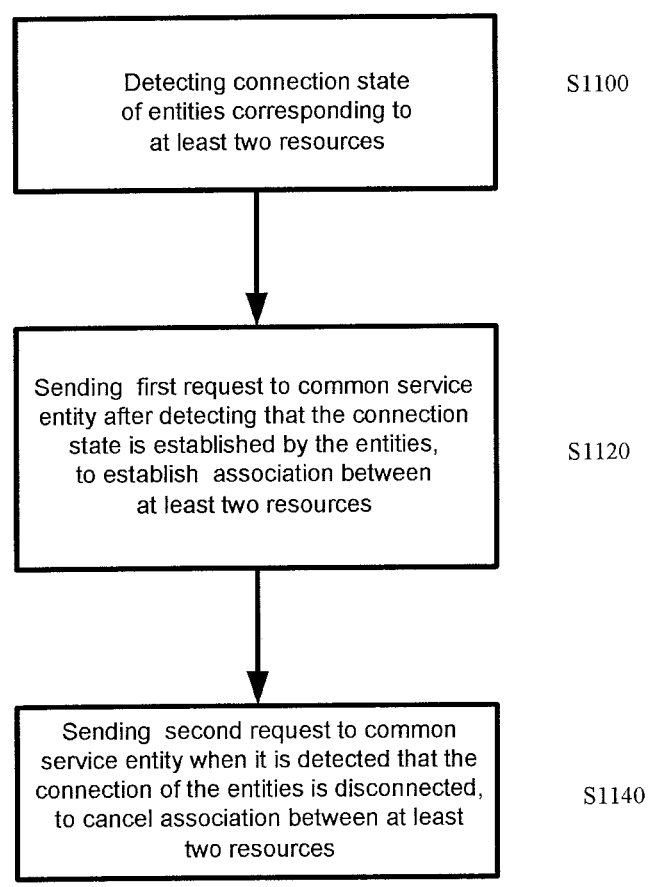
FIGS. 11-13 illustrate flow charts of various methods for associating resources in accordance with embodiments of the disclosure.

According to an aspect of the present disclosure, a method for associating at least two resources is provided. As shown in FIG. 11, the method may include: S1100 for detecting a connection state for entities associated with the at least two resources; and S1120 for sending a first request to a common service entity to establish the association between the at least two resources after it is detected that the connection state is established by the entities.

Optionally, the method may further include: S1140 for sending a second request to the common service entity to cancel the association between the at least two resources when it is detected that the connection of the entities is disconnected.

Optionally, according to the method, detecting the connection state for the entities may include: detecting whether the entities are located in a same local area network.

Optionally, according to the method, detecting the connection state for the entities may include: detecting whether the entities are connected through a wired cable.

Optionally, the first request may be a request for creating or updating a resource, such that the attributes of the resource may be set on the common service entity to establish the association between the at least two resources.

Optionally, the second request may be a request for updating the resource, such that the attributes of the resource may be set on the common service entity to cancel the association between the at least two resources.

Optionally, the created or updated resource may be a group resource or a non-group resource.

For example, as described above in connection with FIGS. 5A-10B, the created or updated resource may be, for example, a created new type of group resource <FlexGroup> or a group resource for associating respective resources which is generated by adding a corresponding resource attribute to an existing group resource <group>. The created or updated resource may also be, for example, a resource corresponding to an entity, such as a resource corresponding to an Application Entity AE, wherein a corresponding resource attribute is added under an entity resource so that it may be used for associating various resources, which is not limited herein.

Optionally, the attribute of the resource may include an associated member list and an association start time. The association start time is used to set a time for establishing an association, and the associated member list is used to set the associated resources.

Optionally, the attribute of the resource may further include an association end time for setting a time for canceling the association.

Optionally, the attribute of the resource may include an associated member record and an association start time record. The association start time record is used to set a time for each association establishment, and the associated member record is used to set a resource to which each association points.

Optionally, the association start time record may also be used to indicate a time for the last association cancellation, and a blank entry in the associated member record may be used to cancel the association.

Optionally, the attribute of the resource may further include an association enabling identifier for setting whether the association between the at least two resources is valid.

Figure 12:
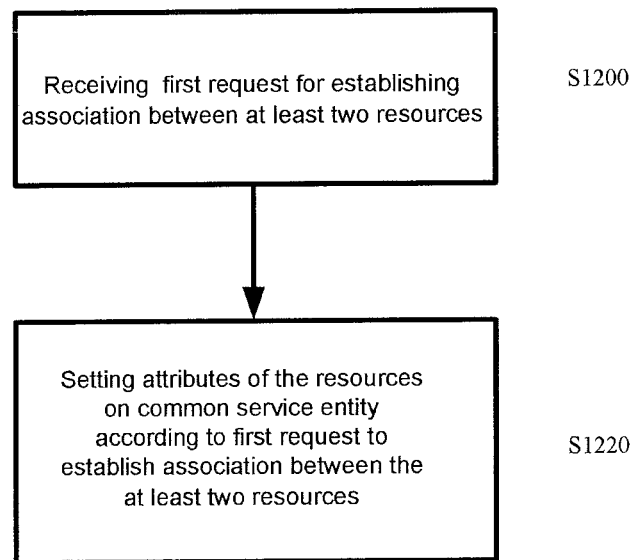

According to another aspect of the present disclosure, a method for associating at least two resources is provided. As shown in FIG. 12, the method may include: S1200 for receiving a first request, wherein the first request is used to establish an association between the at least two resources; and S1220 for setting attributes of the resources on a common service entity according to the first request to establish the association between the at least two resources.

Figure 13:
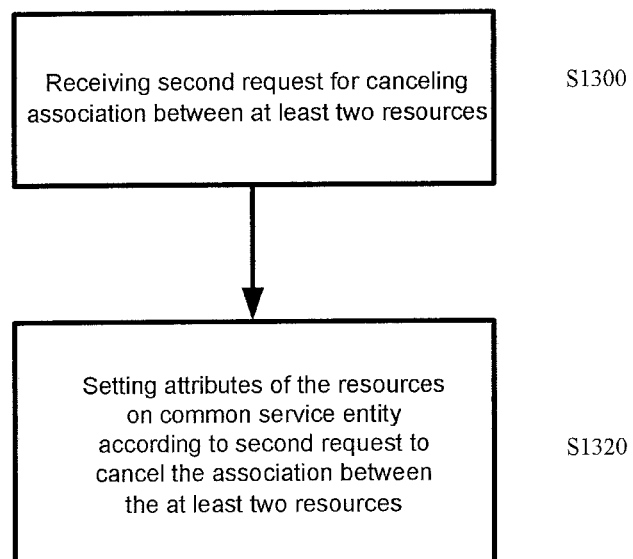

Optionally, as shown in FIG. 13, the method may further include: S1300 for receiving a second request, wherein the second request is used to cancel the association between the at least two resources; and S1320 for setting attributes of the resources on the common service entity according to the second request to cancel the association between the at least two resources.

Optionally, the first request may be a request for creating or updating the resource, and the second request may be a request for updating the resource.

Optionally, the created or updated resource may be a group resource or a non-group resource.

As described above, the created or updated resource may be, for example, a created new type of group resource <FlexGroup> or a group resource for associating respective resources which is generated by adding a corresponding resource attribute to an existing group resource <group>. The created or updated resource may also be, for example, a resource corresponding to an entity, such as a resource corresponding to an Application Entity AE, wherein a corresponding resource attribute is added under an entity resource so that it may be used for associating various resources, which is not limited herein.

Optionally, the attribute of the resource may include an associated member list and an association start time. The method may further include: according to the first request, setting the association start time to indicate a time for establishing the association, and setting the associated member list to indicate the associated resources.

Optionally, according to the method, the attribute of the resource may further include an association end time. The method may further include: according to the second request, setting the association end time to indicate a time for canceling the association.

Optionally, according to the method, the attribute of the resource may include an associated member record and an association start time record. The method may further include: according to the first request, setting the association start time record to indicate a time for each association establishment, and setting the associated member record to indicate a resource to which each association points.

Optionally, the method may further include: according to the second request, updating the association start time record to indicate a time for the last association cancellation, and adding a blank entry in the associated member record for canceling the association.

Optionally, according to the method, the attribute of the resource may further include an association enabling identifier, and the method may further include: according the first request, setting the association enabling identifier to indicate that the association between the at least two resources is valid; or according to the second request, updating the association enabling identifier to indicate that the association between the at least two resources is not valid.

Optionally, according to the method, the first request and the second request may come from the same or different entities.

Optionally, according to the method, the associated at least two resources respectively belong to entities that are located in a same local area network.

Figure 14:
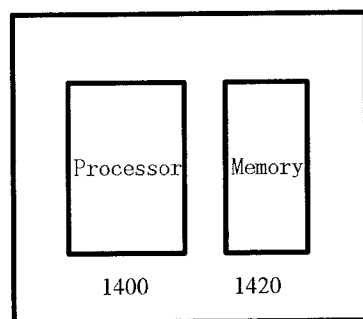
FIG. 14 illustrates a block diagram of a communication terminal in accordance with an embodiment of the disclosure.

According to another aspect of the present disclosure, there is provided a communication terminal, as shown in FIG. 14, including a processor 1400 and a memory 1420, wherein the memory is configured to store program instructions, which, when executed by the processor, cause the processor to implement the foregoing methods.

Optionally, the above communication terminal may include, but not limited to, a mobile phone, an e-book, a PDA, a smart bracelet, a smart speaker, a navigator, a music player, a tablet, a set top box, a home appliance such as a microwave, an electric oven, a refrigerator, a washing machine, a water heater, an air conditioner or the like.

Figure 15:
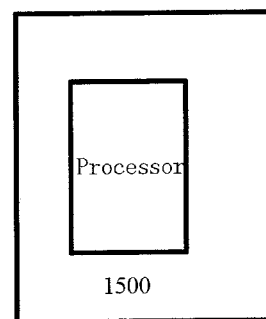
FIG. 15 illustrates a block diagram of a communication node device in accordance with an embodiment of the disclosure.

According to another aspect of the present disclosure, there is provided a communication node device, as shown in FIG. 15, including a processor 1500, wherein the processor is configured to perform the above methods.

Optionally, the above communication node device may include, but not limited to, a server, a personal computer, a set-top box, a mobile phone, an e-book, a PDA, a smart bracelet, a smart speaker, a navigator, a music player, a tablet or the like.

Optionally, the processor described above may include one or more microprocessors that can process data signals and can include various computing structures such as a complex instruction set computer (CISC) architecture, a reduced-architecture instruction set computer (RISC) architecture, or an architecture that implements a combination of a variety of instruction sets. In some embodiments, the processor may also be a microprocessor, such as an X86 processor or an ARM processor, or may be a digital processor (DSP) or the like.

Optionally, the memory may include, for example, a volatile memory and/or a non-volatile memory. The volatile memory may include, for example, a random access memory (RAM) and/or a cache memory (cache) or the like. The non-volatile memory may include, for example, a read only memory (ROM), a hard disk, a flash memory, or the like.

According to a further aspect of the present disclosure, there is also provided a computer readable storage medium on which program instructions may be stored which, when run by a computer, may implement the above methods.

Herein, relational terms such as first and second and the like are merely used to distinguish one entity or operation from another entity or operation without necessarily requiring or implying that any such actual relationship or sequence exists between these entities or operations. Moreover, the terms "include," "contain," or any other variations thereof are intended to cover a non-exclusive inclusion such that a process, method, article, or apparatus that includes a list of elements includes not only those elements but also other elements that are not explicitly listed, or elements that are inherent to such process, method, article, or apparatus. Without further limitations, an element limited by a statement "including a . . . " does not exclude the existence of additional identical elements in the process, method, article, or apparatus that includes the element.

Those skilled in the art will understand that the block diagrams appearing in this specification represent conceptual views of illustrative circuits that implement the principles of the present disclosure. Similarly, it will be understood that any flow chart, flowchart, state transition diagram, pseudo-code, etc., represents a variety of processes that can be substantially represented in computer-readable media and executed by a computer or processor, whether or not the computer or processor is explicitly shown. A computer readable medium and code written can be implemented in a transitory state (signal) and a non-transitory state (e.g., on a tangible medium such as a CD-ROM, DVD, Blu-ray, hard drive, flash memory card, or other type of tangible storage medium).

The functions of the various elements shown in the figures may be provided through the use of dedicated hardware and hardware capable of executing software in conjunction with suitable software. When provided by a processor, the functions may be provided by a single dedicated processor or a single shared processor or multiple independent processors where some processors may be shared. Also, the explicit use of the term "processor" or "controller" should not be interpreted as exclusively referring to hardware capable of executing software, but may implicitly include, without limitation, digital signal processor ("DSP") hardware, read-only memory ("ROM") for storing software, random access memory ("RAM"), and nonvolatile memory.

Some specific embodiments have been described above. However, it should be understood that these embodiments may be modified. For example, elements of different embodiments may be combined, supplemented, modified, and deleted to obtain further embodiments. In addition, those of ordinary skill in the art should understand that the structures and processing flows that have been disclosed above may be replaced with other structures and processing flows to obtain other embodiments. The other embodiments implement substantially the same function, at least in substantially the same way, to achieve substantially the same effect provided by the embodiments of the present disclosure. Accordingly, these and other embodiments should fall within the scope of this disclosure.

I claim:

1. A method for associating at least two resources, the method comprising:
   detecting a connection state for entities respectively corresponding to the at least two resources; and
   sending a first request to a common service entity to establish an association between the at least two resources after it is detected that the connection state is established by the entities,
   wherein the first request is a request for creating or updating a resource, such that attributes of the resource are set on the common service entity to establish the association between the at least two resources;
   wherein the attributes of the resource comprise an associated member list and an association start time,
   wherein the association start time is used to set a time for establishing the association, and the associated member list is used to set the associated resources.

2. The method according to claim 1, further comprising:
   sending a second request to the common service entity to cancel the association between the at least two resources when it is detected that the connection of the entities is disconnected.

3. The method according to claim 2, wherein the second request is a request for updating the resource, such that the attributes of the resource are set on the common service entity to cancel the association between the at least two resources.

4. The method according to claim 3, wherein the attributes of the resource comprise an associated member record and an association start time record,
   wherein the association start time record is used to set a time for each association establishment, and the associated member record is used to set a resource to which each association points.

5. The method according to claim 4, wherein the association start time record is further used to indicate a time for the last association cancellation, and a blank entry in the associated member record is used to cancel the association.

6. The method according to claim 1, wherein the detecting of the connection state for entities respectively corresponding to the at least two resources comprises:
   detecting whether the entities respectively corresponding to the at least two resources are located in a same local area network.

7. The method according to claim 1, wherein the created or updated resource is a group resource or a non-group resource.

8. The method according to claim 1, wherein the attribute of the resource further comprises an association end time for setting a time for canceling the association.

9. The method according to claim 1, wherein the attributes of the resource further comprise an association enabling identifier for setting whether the association between the at least two resources is valid or not.

10. A method for associating at least two resources, comprising:
    receiving a first request for establishing an association between the at least two resources; and
    setting attributes of the resources on a common service entity according to the first request to establish the association between the at least two resources, wherein the attributes of the resource comprise an associated member list and an association start time, and the method further comprises:
according to the first request, setting the association start time to indicate a time for establishing the association, and setting the associated member list to indicate the associated resources.

11. The method according to claim 10, further comprising:
receiving a second request for canceling the association between the at least two resources; and
setting attributes of the resources on the common service entity according to the second request to cancel the association between the at least two resources.

12. The method according to claim 11, wherein the attributes of the resources further comprise an association end time, and the method further comprises:
according to the second request, setting the association end time to indicate a time for canceling the association.

13. The method according to claim 11, wherein the attributes of the resources comprise an associated member record and an association start time record, and the method further comprises:
according to the first request, setting the association start time record to indicate a time for each association establishment, and setting the associated member record to indicate a resource to which each association points.

14. The method according to claim 13, further comprising:
according to the second request, updating the association start time record to indicate a time for the last association cancellation, and adding a blank entry in the associated member record for canceling the association.

15. The method according to claim 11, wherein the attributes of the resources further comprise an association enabling identifier, and the method further comprises:
according the first request, setting the association enabling identifier to indicate that the association between the at least two resources is valid; or
according to the second request, updating the association enabling identifier to indicate that the association between the at least two resources is not valid.

16. A communication terminal comprising a processor and a memory, wherein:
the memory is configured to store program instructions, which, when executed by the processor, cause the processor to implement the method of claim 1.

17. A communication node device comprising a processor, wherein:
the processor is configured to perform the method of claim 10.

* * * * *